United States Patent [19]

Merrett et al.

[11] Patent Number: 4,875,811

[45] Date of Patent: Oct. 24, 1989

[54] APPARATUS AND METHOD FOR TRANSPORTING AND UNLOADING CONTAINERS

[75] Inventors: Ronald G. Merrett; Oscar Eakin, Jr., both of Houston, Tex.

[73] Assignee: Intermodal Container Systems, Harris County, Tex.

[21] Appl. No.: 301,985

[22] Filed: Jan. 25, 1989

Related U.S. Application Data

[63] Continuation of Ser. No. 10,010, Feb. 2, 1987, abandoned, which is a continuation-in-part of Ser. No. 871,692, Jun. 6, 1986, abandoned.

[51] Int. Cl.⁴ .................... B65G 53/46; B60P 1/16
[52] U.S. Cl. ........................... 406/39; 406/36; 406/41; 406/65; 406/131; 406/122; 222/105; 222/166; 298/22 R; 414/350; 414/412; 414/425; 414/482; 414/489
[58] Field of Search .............. 406/36, 39, 41, 65, 406/73, 131, 63, 64, 67, 43, 44, 122, 128; 414/350, 399, 412, 421, 469, 425, 482, 489, 575, 786; 298/22 R; 222/105, 166; 280/163; 182/115; 296/162; 105/425, 443, 457, 460

[56] References Cited

U.S. PATENT DOCUMENTS

| | | | |
|---|---|---|---|
| 2,513,737 | 7/1950 | Norbom | 406/122 |
| 2,813,640 | 11/1957 | Loomis | 406/67 |
| 3,155,248 | 11/1964 | Haller | 414/350 |
| 3,219,392 | 11/1965 | Gerber | 406/36 |
| 3,224,813 | 12/1965 | Jezo | 406/64 |
| 3,270,921 | 9/1966 | Nadolske et al. | 406/67 X |
| 3,428,366 | 2/1969 | Harvey | 406/36 X |
| 3,696,952 | 10/1972 | Bodenheimer | 414/412 X |
| 3,807,317 | 4/1974 | Stark | 406/122 X |
| 3,951,284 | 4/1976 | Fell et al. | 414/350 X |
| 4,054,226 | 10/1977 | Bjelland et al. | 414/469 X |
| 4,232,803 | 11/1980 | Muller et al. | 222/105 |
| 4,301,943 | 11/1981 | Barends et al. | 406/98 X |
| 4,474,526 | 10/1984 | Gevers | 414/421 |

FOREIGN PATENT DOCUMENTS

| | | | |
|---|---|---|---|
| 1811095 | 7/1969 | Fed. Rep. of Germany | 414/482 |
| 8203826 | 11/1982 | World Int. Prop. O. | 414/469 |

*Primary Examiner*—Joseph F. Peters, Jr.
*Assistant Examiner*—James M. Kannofsky
*Attorney, Agent, or Firm*—Vinson & Elkins

[57] ABSTRACT

An apparatus and method for transporting and unloading a container (10, 10A) carrying particulate lading which is removably mounted on a tiltable support frame (76, 76A) pivotally mounted on a highway trailer (54, 54A). At the unloading site, a portable throttle valve assembly (108, 108A) and flexible connecting hose (166, 166A) are connected to the container (10, 10A) and the container (10, 10A) is tilted by the support frame (76, 76A) to an angle above the angle of repose of the lading for gravity unloading of the lading from the container (10, 10A) in to a trailer mounted rotary valve (148, 148A) which forms an air lock over a subjacent pneumatic hopper structure (144, 144A) for pneumatic conveyance of the lading to a storage facility. The height of the discharge opening (46, 46A) in the container (10, 10A) above the rotary valve (148, 148A) during unloading is sufficient to provide a continuous gravity flow of lading from the container (10, 10A) to the rotary valve (148, 148A) at an angle at least generally similar to the angle of repose of the lading being unloaded.

48 Claims, 14 Drawing Sheets

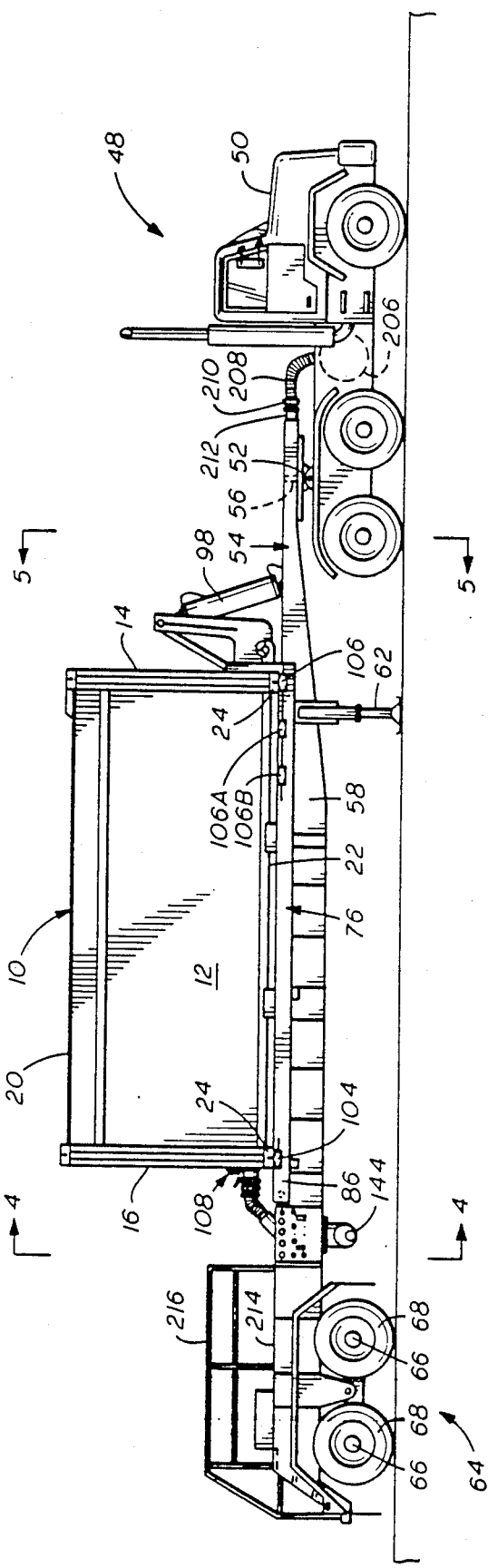
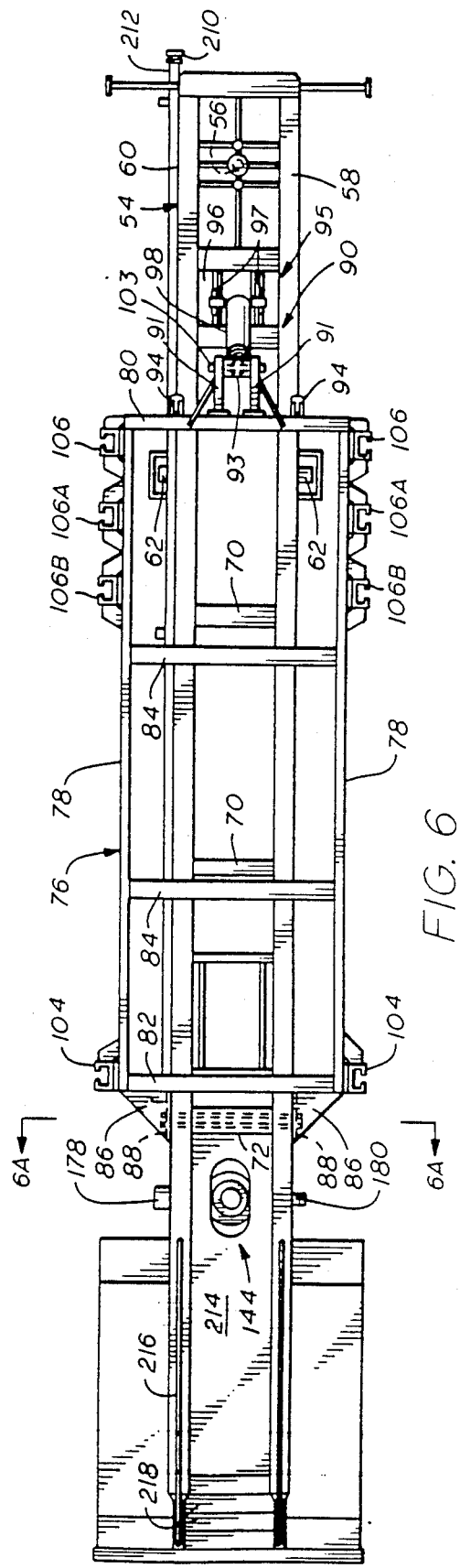
FIG. 3
FIG. 6

APPARATUS AND METHOD FOR TRANSPORTING AND UNLOADING CONTAINERS

RELATED APPLICATION

This application is a continuation of application Ser. No. 07/010,010, filed Feb. 2, 1987, now abandoned which is a continuation-in-part of application No. 06/871,692 filed June 6, 1986, now abandoned.

BACKGROUND OF THE INVENTION

This invention relates generally to transporting and unloading containers, and more particularly to an apparatus and method for transporting particulate lading in a container from one site and then unloading the particulate lading from the container at a second site.

Particulate ladings, such as polycarbonate or thermoplastic materials, synthetic resins, for example, are normally loaded within boxes, bags, containers or the like at a site where the polycarbonate plastic material is manufactured, and then transported by wheeled vehicle to a site where the plastic material is unloaded from the container into a storage facility for subsequent use in the manufacture of various plastic end products. It is highly desirable that such plastic materials or ladings, such as polyethylene pellets, not be contaminated by foreign matter or the like as even small amounts of foreign matter or contamination affect the quality of the subsequent manufactured products. Heretofore, plastic liners or bags such as vinyl or polyethylene liners have been used within containers to protect the lading from contamination. The plastic liners are normally sealed at the initial loading site and the lading is maintained in sealed relation within the plastic liner until unloaded at the unloading site, thereby insuring that the plastic lading will not be contaminated. Normally, the plastic lading is unloaded at the unloading site from the container by a suction or vacuum line extending within the container and then is conveyed pneumatically to a storage facility, such as bins, silos, or the like, until needed for the production of plastic end products. Pressurized air is sometimes used to push or aid in pushing the particulate plastic material from a container into a pneumatic discharge line for pneumatically conveying the plastic material into the storage facility.

U.S. Pat. No. 4,247,228 dated Jan. 27, 1981 shows a dump tractor or trailer having a container secured thereon for transporting sand and a pneumatic conveyor is secured to an end of the container for unloading the sand. Upon unloading, the container is tilted for discharge into a pneumatic conveyor and air is drawn in the container through hatches as the sand is dumped from an opening at the rear of the container. The container or truck bed is not removable and cannot be loaded at a site separate from the dump truck or trailer.

U.S. Pat. No. 4,449,861 dated May 22, 1984 shows a system for transporting plastic articles utilizing a tiltable van which is supplied with compressed air for forcing the plastic articles from an outlet at the end of the van for discharge into a pneumatic conveyor. The tiltable van is fixed to the vehicle and cannot be unloaded at a site separate from the dump truck or trailer.

Prior art unloading systems heretofore have utilized trailers with container support frames pivotally mounted for tilting at an end of the trailer for unloading particulate lading from an end of the container by gravity. However, such prior art trailers have not utilized pneumatic discharge apparatus mounted on the trailer forwardly of the rear wheels thereof and rearwardly of the rear end of the container for effective unloading of the container by gravity upon tilting of the container.

SUMMARY OF THE INVENTION

This invention is directed particularly to a transportation system for transporting plastic particulate material in a sealed condition from one location or site where the plastic lading is loaded into a container having a plastic liner or bag therein, to another location or site where the sealed liner or bag within the container is broken for unloading of the plastic lading from the container.

The container after being loaded and sealed at the first site is transferred to a tiltable container support frame on a highway vehicle for transport to the second site where the sealed container is broken and then tilted by the tiltable support frame to an angle above the angle of repose of the plastic lading within the container for discharge of the lading by gravity from the container into a pneumatic discharge line for pneumatic conveying to a suitable storage facility, such as a storage bin or silo.

The container utilized with the apparatus and method of the present invention is preferably a standard removable container such as used in intermodal transportation in so-called COFC (container on railway flat car) service, on container ships, or on highway trailers, for example.

One end of the container has a pair of doors which are normally latched in closed position during transit. Suitable wooden framing members are provided within the container adjacent the closed doors to provide an end support for a cardboard backing member having a lower discharge opening therein and against which the plastic liner or bag is supported. The plastic bag is filed with lading from a flexible hose extending within an upper tubular inlet extension or neck of the liner adjacent the outer upper portion of the container. Upon filling of the plastic bag with lading, the extending tubular extension is sealed by suitable banding or ties, and thus the lading is sealed within the plastic bag for transport to an unloading site.

The loaded container is then transferred to a tiltable container support frame pivotally mounted on a highway trailer body and is releasably secured thereon for transport by a highway vehicle to an unloading site. At the unloading site, at least one of the end doors of the container is opened to expose the bottom discharge opening for the lading in the adjacent cardboard backing member and another lower tubular extension or neck of the loaded plastic bag is positioned adjacent the discharge opening. The inner end of the tubular extension of the plastic bag is sealed at its juncture with the bag by a sealing membrane defined by the portion of the bag covering the inner end of the tubular extension. This sealing membrane must be cut or removed in order for the lading to be unloaded from the plastic bag. Thus, the lading is tightly sealed upon loading within the plastic bag, and the plastic bag remains in a sealed condition until it is opened by slitting the membrane for gravity discharge directly into a pneumatic conveyor at the unloading site. The container or the plastic bag is not pressurized in any manner during unloading and the plastic bag collapses as the lading is removed or discharged. Thus, loss of lading after loaded within the plastic bag in the container until the lading is discharged into the pneumatic unloading system at the unloading site is minimized.

The gravity unloading of the lading from the container at the unloading site is obtained by first tilting the container support frame having the loaded container thereon to an angle above the angle of repose of the lading and thus the lading flows by gravity from the plastic bag in the container through the tubular extension and discharge opening in the cardboard backing member into the pneumatic conveying system.

It is noted that highway vehicles traveling over interstate highways are governed by U. S. Federal Regulations for bridges and this controls the design of such highway vehicles. Included in such bridge regulations are the requirements of a total weight of eighty thousand (80,000) pound for the tractor, trailer, and loaded container on the trailer. Thus, the so-called tare weight of the trailer is desired to be at a minimum in order for a loaded container thereon to carry a maximum amount of particulate lading within the container. The trailer comprising the present invention has been particularly designed to be within such federal regulations but yet to carry a maximum amount of particulate lading. Containers of twenty (20) feet in length and having a lading weight of between around forty-two thousand (42,000) pounds and forty-five thousand (45,000) pounds are normally utilized for the transport of particulate lading, such as plastic pellets or the like, which are unloaded pneumatically at an unloading site.

Further, regulations control the length of a trailer with rear tandem axles and a maximum length of forty-two (42) feet is permitted. Thus, the pneumatic conveying apparatus and the connecting lading conduits between the end of the container and the pneumatic conveying apparatus must be carefully positioned between the rear end of the container and the rear tandem wheels in order to permit an effective and satisfactory gravity unloading of particulate lading from the rear end of the tilted container to a rotary valve which feeds the particulate lading into an air stream in a lower hopper for pneumatic conveyance to a storage site such as a silo, for example. A flexible lading conduit connects a throttling control valve adjacent the lading discharge opening at the rear of the tilted container and a rotary valve mounted on the trailer rearwardly of and below the container for receiving the lading at a relatively fast flow rate from the container. The pivoted container support frame is mounted for pivotal movement at a location spaced a substantial distance horizontally from the rear end of the container in order to provide a sufficient vertical height for the rear discharge opening in the container to discharge effectively the particulate lading from the container by gravity into the rotary valve.

As an example, a container twenty (20) feet in length and loaded with polyethylene lading of around forty-four thousand (44,000) pounds may be unloaded in around two and one-half (2½) hours by the present apparatus and method with a negligible amount, less than ten (10) pounds, of lading remaining in the container after unloading. Prior art apparatus and methods utilizing a suction line connected to the container have required over four (4) hours for unloading such a loaded container and a substantial amount of lading, such as around one hundred (100) pounds or more, has remained in the container after such unloading.

An object of this invention is to provide a transportation system in which a standard container is utilized as presently used in so-called COFC (container on railway flat car) service, on container ships, or on highway trailers, for the transportation of particulate ladings from on site at which the lading is loaded within the container, to a second site at which the lading is unloaded from the container.

Another object of this invention is to provide an apparatus and method for unloading such a container with a negligible loss of lading during unloading of the particulate lading from the container resulting from a maximum clean out of the container.

Still another object of the present invention is to provide a transportation system for transporting plastic particulate materials in a sealed condition from one location or site at which the plastic lading is loaded within the container, and then transporting the loaded container on a tiltable support frame of a highway vehicle to another location or site where the lading is unloaded by gravity into a pneumatic conveyor after tilting of the container support frame thereby to unload the lading by gravity from the container into a pneumatic conveyor in a minimum of time.

A further object of the invention is to provide in such a transportation system a wheeled highway vehicle to carry the loaded container from the loading site to an unloading site and having a tiltable frame thereon for supporting the container so that upon unloading one end of the container may be raised above the angle of repose of the lading thereby to provide effective gravity unloading from a raised discharge opening in the container without the container or plastic bag within the container being pressurized in any manner.

Another object is to provide a highway trailer which is within existing federal regulations for transport over bridges of interstate highways and includes the mounting of suitable pneumatic conveying means on the trailer between the rear end of the container and the rear wheels of the trailer. Such conveying means includes a throttling control valve removably positioned adjacent the discharge opening of the container and a flexible lading conduit from the container to a rotary valve mounted on the trailer rearwardly of and below the container to receive the lading by gravity for feeding into an air stream in a hopper beneath the rotary valve.

An additional object is to provide a gravity unloading system for a tilted container on a highway trailer in which a pneumatic conveying means on the trailer and a rear discharge opening in the container are easily connected by a detachable lading conduit prior to tilting of the container on the highway trailer for gravity unloading.

Other objects, features, and advantages of this invention will become more apparent after referring to the following specification and drawings.

FIG. 3 is a side elevation of a combined highway trailer and tractor with the trailer having a tiltable container support frame thereon supporting the loaded container thereon as shown;

FIG. 6 is a top plan of the highway trailer shown in FIG. 3 with the loaded container removed from the tiltable container frame;

FIGS. 19–27 illustrate an improved system for positioning and connecting the pneumatic conveying means on the trailer to the lading discharge opening in the rear of the container to provide a fast gravity flow of lading from the container to the pneumatic conveying means upon tilting of the container in which:

FIG. 19 is a partial side elevation of the rear of the trailer with the container positioned thereon prior to the connection of the container to the pneumatic unloading means on the trailer;

FIG. 20 is a top plan of the rear of the trailer shown in FIG. 19 prior to connection of the lading conduit and throttle valve assembly to the container;

FIG. 21 is an end elevation of a throttle valve assembly mounted on the vertical extending support frame detachably mounted on the end of the container support frame adjacent the lading discharge opening of the container;

FIG. 22 is a top plan view of the throttle valve assembly and support frame shown in FIG. 21;

FIG. 23 is a side elevation of the throttle valve assembly and support frame shown in FIGS. 21 and 22;

FIG. 24 is a side elevation of the apparatus shown in FIG. 19 after connection of the lading conduit and throttle valve assembly to the container and further showing a manual means for pivoting of the rotary valve and the lading receiver connected thereto;

FIG. 25 is a cross-sectional view taken generally along the lines 25—25 of FIG. 24 and showing the pivotal mounting of the rotary valve and the subjacent pneumatic hopper to the trailer;

Figure 24:
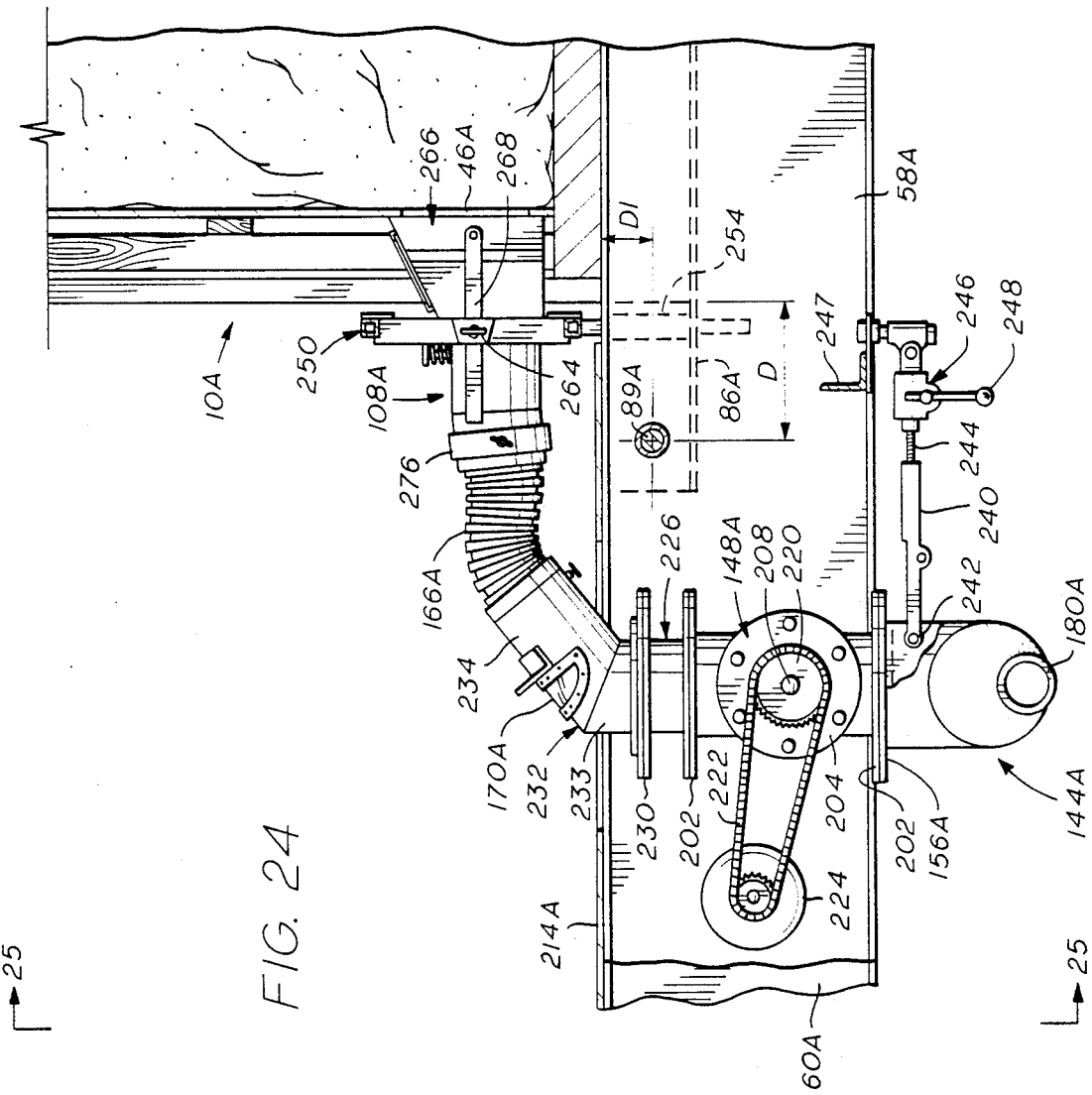
Figure 26:
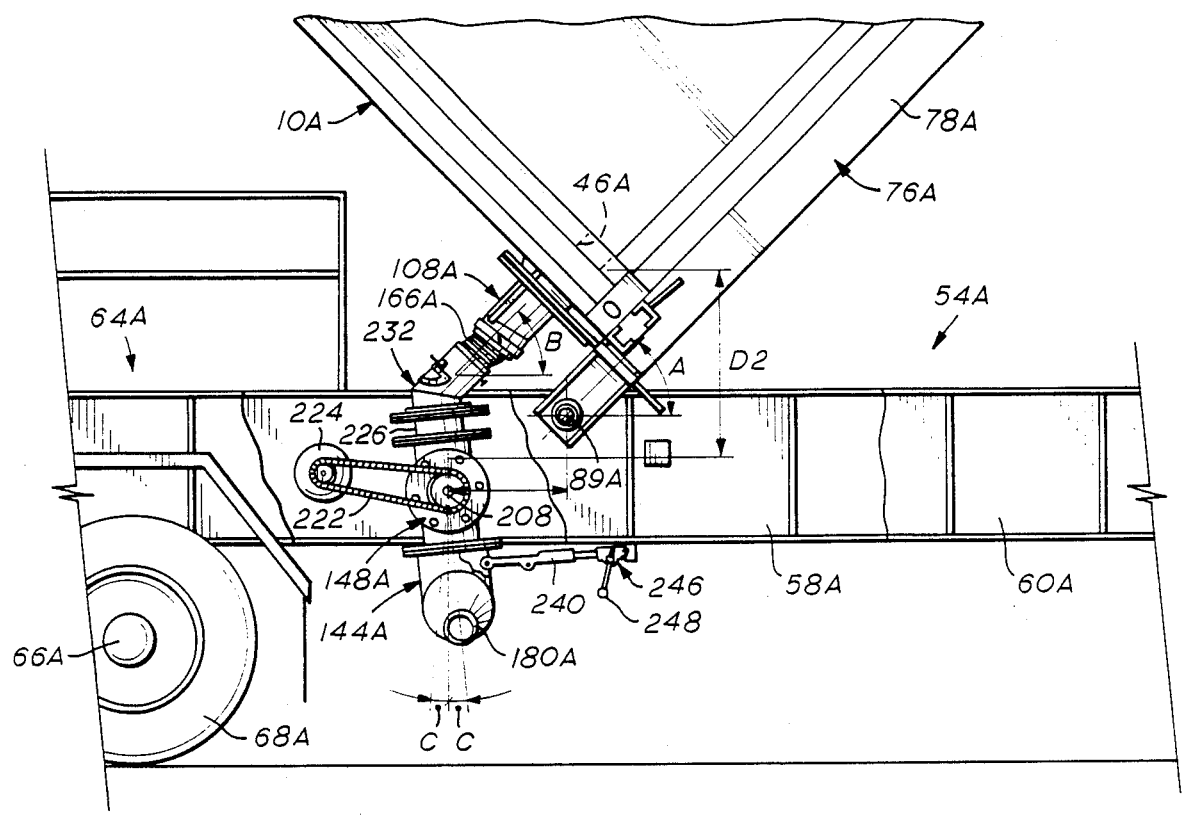
Figure 27:
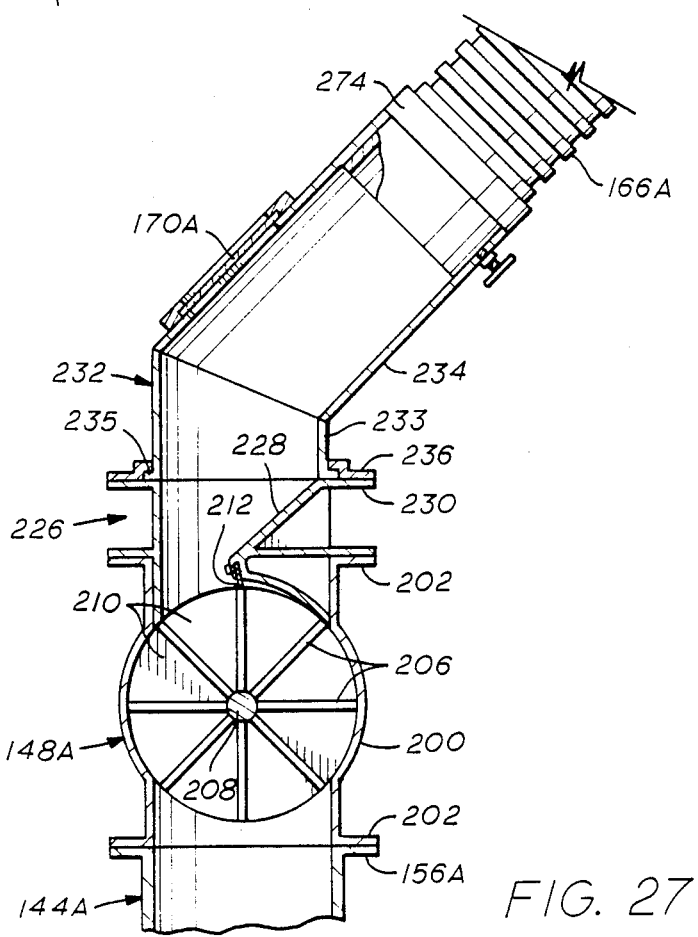

FIG. 26 is a side elevation similar to FIG. 24 but showing the container and container support frame tilted at an angle of around forty-five (45) degrees for gravity unloading of the lading; and FIG. 27 is a sectional view of the rotary valve and associated structure illustrating the gravity feeding of the lading into the pockets of the rotary valve for subsequent discharge into the subjacent pneumatic hopper.

Referring now to the drawings for a better understanding of this invention, and more particularly to FIGS. 1–4, a container generally indicated at 10 is provided. Container 10 is preferably a standard container such as twenty (20) feet in length used in intermodal transportation such as in so-called COFC (container on flat car) service, container ships, or highway trailers, and has a pair of sides 12 connected by an end 14 at one end. The other end of container 10 has a pair of doors 16 hinged at 18 for movement between open and closed positions. Latch-type members shown at 19 are provided to secure doors 16 in a closed latched position. Container 10 has a top 20 and a bottom 22. Mounted on the corners of bottom 22 are corner fittings 24 which have suitable openings therein adapted to receive locking pins for releasably mounting container 10 onto supporting transport means, such as highway trailers.

Container 10 of the present invention is preferably utilized with highway vehicles and with the transport of plastic particulate lading, such as plastic pellets or the like, used in the manufacture of various plastic end products. The plastic particulate materials are normally transported from a plant where the plastic pellets or the like are manufactured, to a plant at another site where the plastic end products are manufactured from the plastic particulate materials. It is highly desirable that such plastic materials not be contaminated with foreign matter as the quality of the final manufactured product may be affected. Thus, it is desirable that the plastic lading be sealed from the environment after being loaded into container 10 until unloaded at an unloading site for conveyance to a storage facility where the plastic particulate material enters a manufacturing process for manufacture of a plastic end product. For this purpose, a plastic bag generally indicated at 26 and formed of polyethylene having a thickness of around .012 inch, for example, is placed within container 10 to receive the lading therein. Bag 26, as shown particularly in FIG. 2 has an upper tubular extension or boot 30 which receives a flexible discharge hose shown in broken lines at 32 for the discharge of the plastic lading therethrough. Upon loading of plastic bag 26, tubular extension 30 is sealed by a band 34. It is noted that a lower tubular boot or extension 36 is provided and a portion of bag 26 closes the inner end of extension 36 to form a membrane or closure 38.

Figure 1:
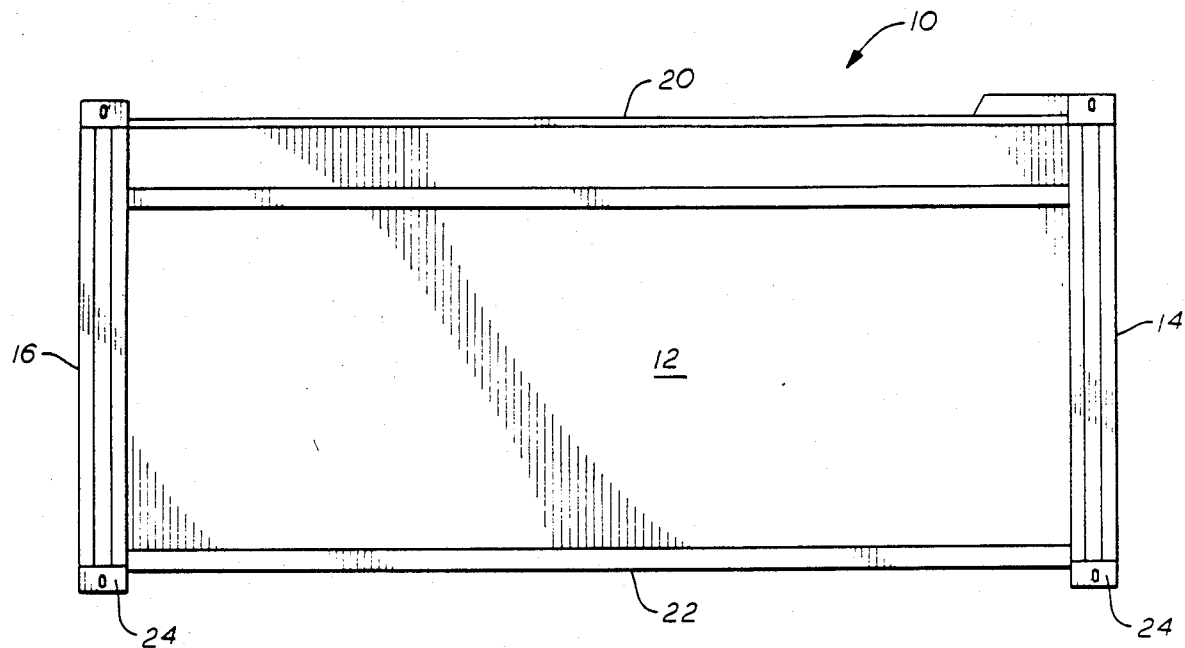
FIG. 1 is a side elevation of a standard container twenty (20) feet in length used in accordance with the present invention and having a plastic liner or bag therein loaded with particulate lading in a sealed condition for transit.
Figure 2:
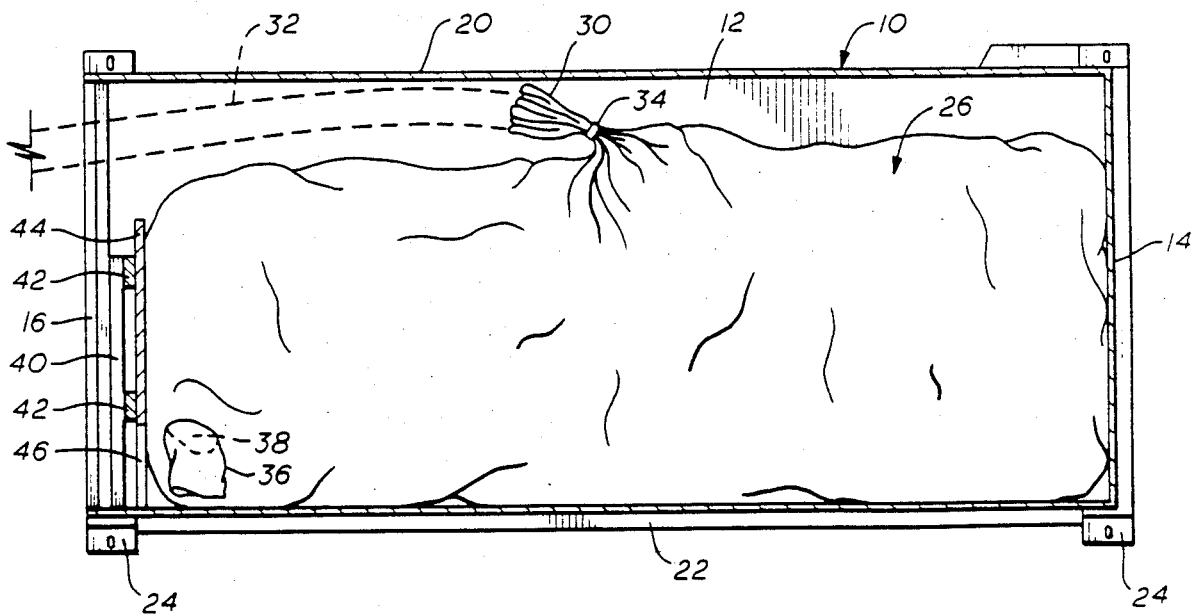
FIG. 2 is a perspective of the loaded container shown in FIG. 1 with a side removed for showing the plastic bag and lading loaded within the plastic bag in a sealed condition.
Figure 5:
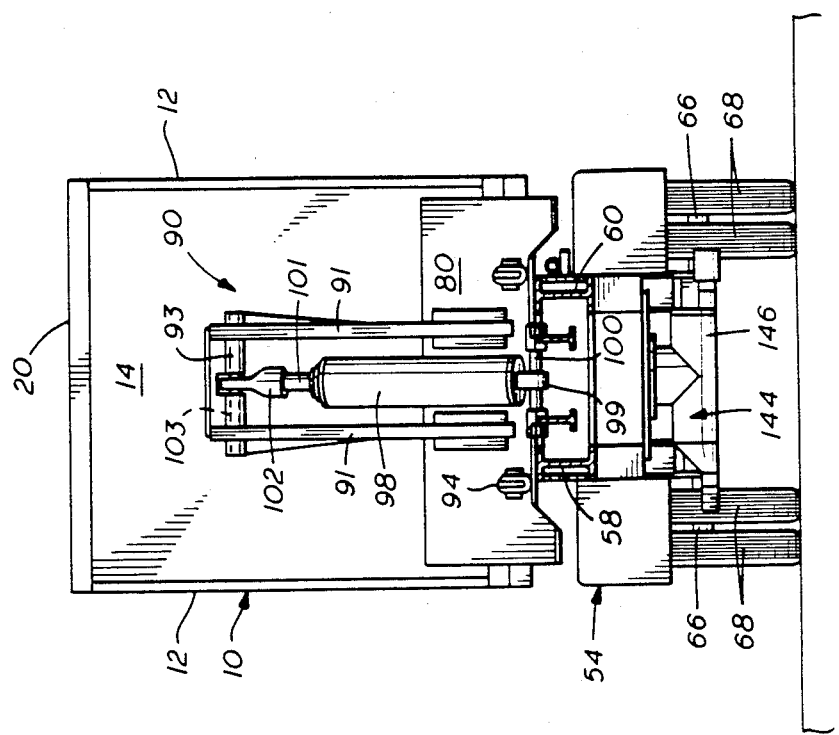
FIG. 5 is a section view taken along the line 5—5 of FIG. 3 and showing the opposite end of the container with power means to pivot the tiltable container support frame and the loaded container thereon to a height above the angle of repose of the lading thereby to permit gravity unloading without any pressurizing of the container.
Figure 4:
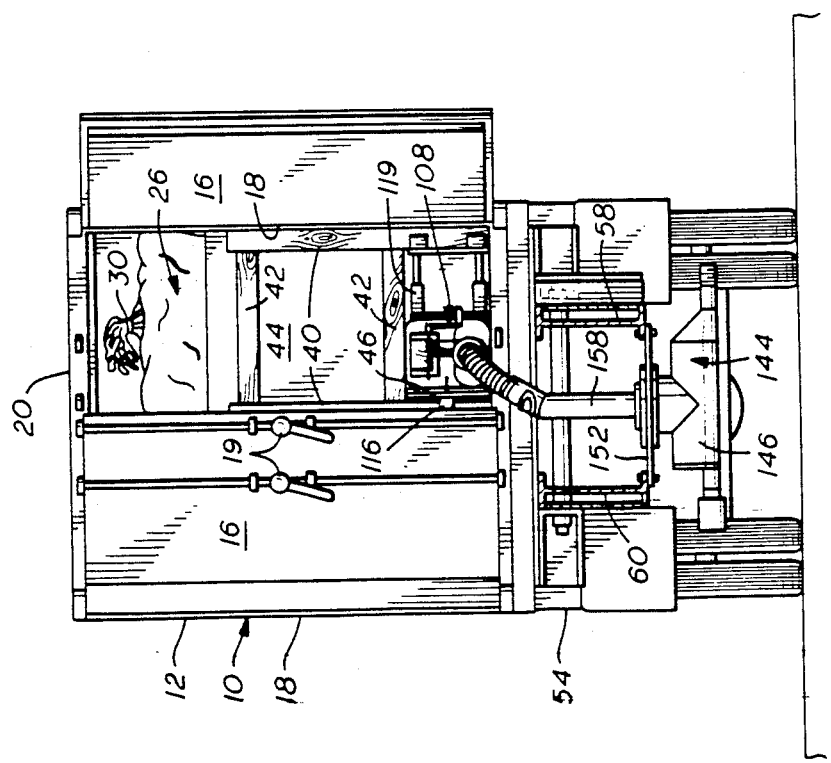
FIG. 4 is a section view taken generally along the line 4—4 of FIG. 3 and showing one end of the container with one of the end doors opened and exposing a discharge opening in the cardboard backing member for unloading lading.
Figure 7:
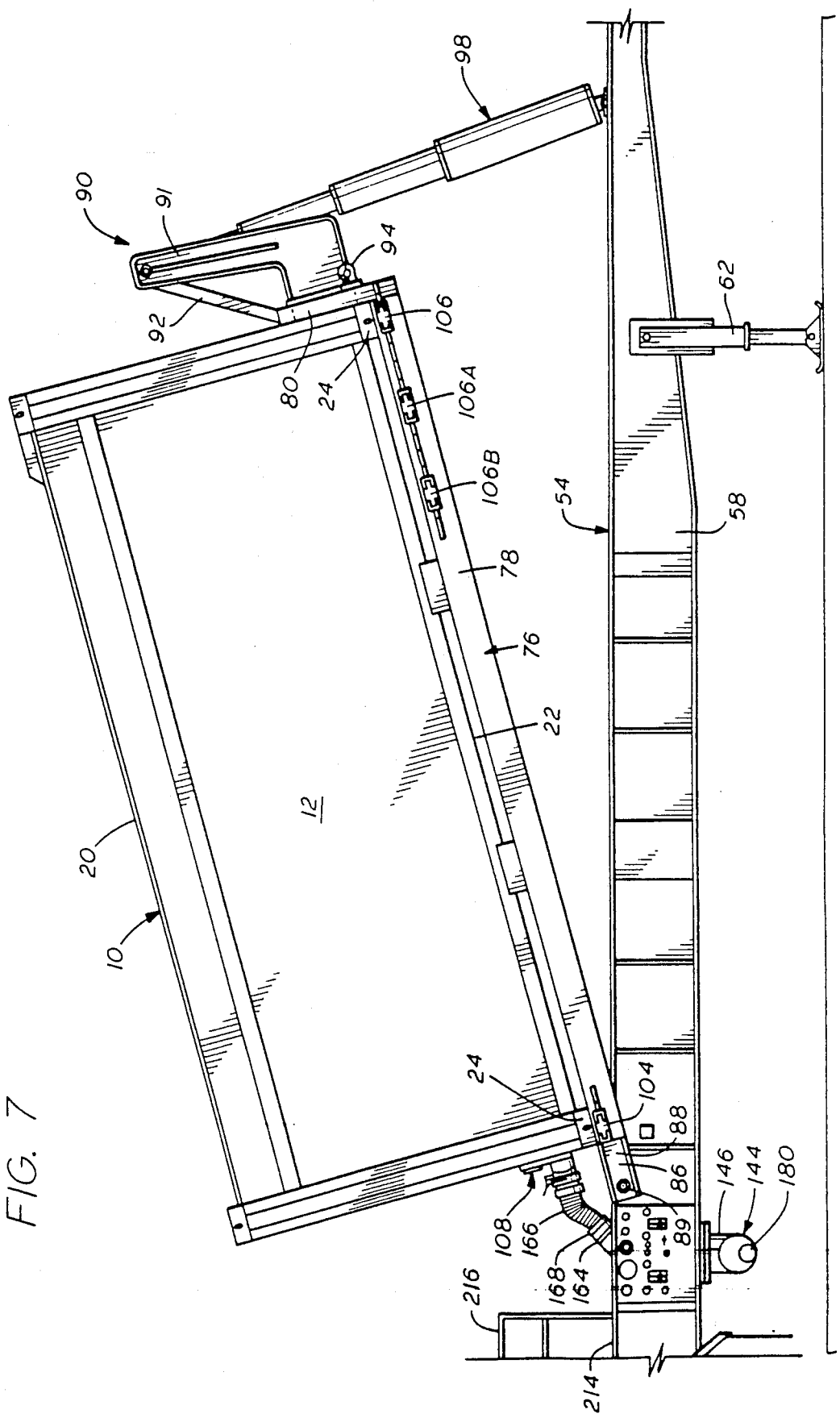
FIG. 7 is an enlarged elevation view of the container support frame and loaded container thereon tilted to an angle above the angle of repose of the lading for unloading the lading by gravity into a pneumatic conveyance system.
Figure 8:
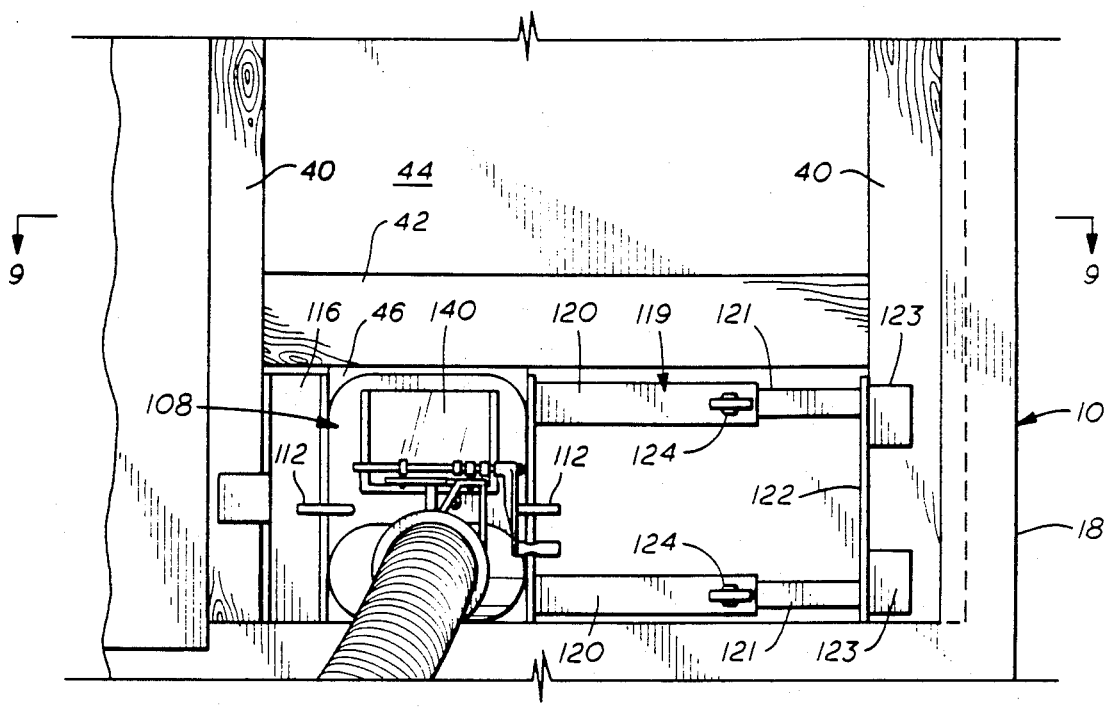
FIG. 8 is an enlarged fragment of one end of the container with one end door opened and showing the throttle valve assembly removably positioned adjacent the discharge opening in the cardboard backing member for controlling the flow of lading from the plastic bag within the container.
Figure 9:
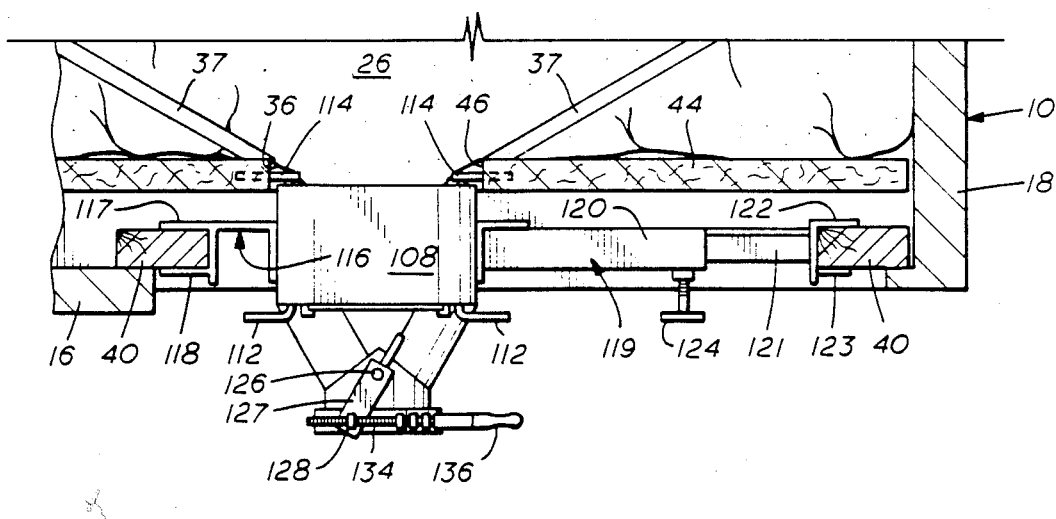
FIG. 9 is a section taken generally along line 9—9 of FIG. 8.

To support loaded plastic bag 26 adjacent end door 16, vertical wooden framing members 40 are mounted within container 10 adjacent end door 16, and horizontal extending wooden frame members 42 are secured to vertical framing members 40. A cardboard or corrugated backing sheet or member indicated at 44 and being around three inches in thickness is supported against members 42 and a lower discharge opening 46 is provided in backing sheet 44. Backing sheet 44 restrains the loaded plastic bag 26 from outward movement upon opening of door 16. It is noted that tubular boot 36 is positioned adjacent opening 46 for discharge of the lading from bag 26, as will be explained. In order to prevent lading from collecting in the corners of container 10 adjacent discharge outlet 46, suitable diverging cardboard wing members shown at 37 on FIG. 9 may be provided to direct the lading in bag 26 toward discharge outlet 46 thereby providing a maximum Clean out of lading from container 10 and plastic bag 26.

After loading of plastic bag 26 in container 10 with the plastic particulate lading, the loaded container is transferred by suitable transfer apparatus, such as a crane or lift truck, for example, onto a highway vehicle generally indicated at 48 for transport to another site, such as a manufacturing site for plastic end products. Highway vehicle 48 includes a tractor 50 having a fifth wheel 52 thereon. A trailer indicated generally at 54 has a kingpin 56 thereon releasably connected to fifth wheel 52, as is well known.

Figure 6A:
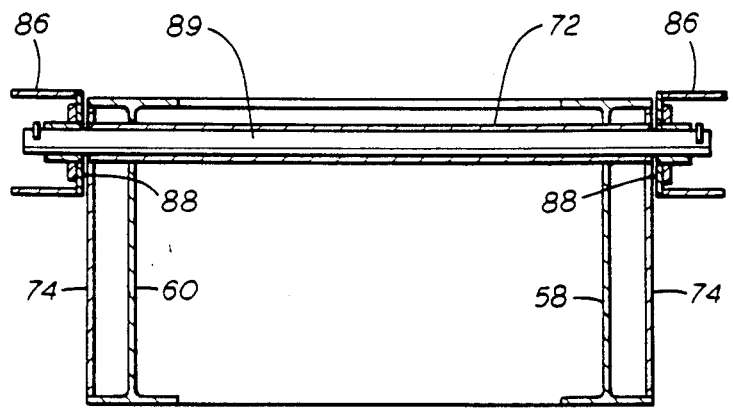
FIG. 6A is a section taken generally along line 6A—6A of FIG. 6 and showing the support for pivoting of the container support frame.

Trailer 54 has a body including a pair of spaced I-beams 58 and 60. I-beams 58 and 60 have adjustable support legs generally indicated at 62 mounted thereon for supporting trailer 54 when disconnected from tractor 48. A rear chassis generally indicated at 64 includes a pair of horizontally spaced tandem axles 66 and associated wheels 68. Transverse reinforcement members 70 extend between the webs of I-beams 58 and 60. As shown particularly in FIG. 6A, a tubular member 72 extends between and is welded to the webs of I-beams 58 and 60. Side plates 74 extend between and are welded to the outer flanges of I-beams 58, 60 and tubular member 72 is likewise welded to side plates 74 for reinforcement of tubular member 72.

A tilting container support frame is generally indicated at 76 and comprises a pair of spaced longitudinal frame members 78 connected at their ends by end frame members 80 and 82. Cross members 84 are secured between side members 78 for reinforcement. End member 82 has spaced gusset web members 86 secured thereto arranged in a box-type construction. The inner facing surfaces of box-type gusset members 86 are closed by vertical plates 88 which receive the opposed ends of an axle 89 which is mounted within tubular member 72 for relative rotational movement. Axle 89 forms a pivot for frame 76 which is spaced horizontally from the adjacent rear end of container 10 at least one (1) foot and preferably around two (2) feet in order to permit discharge opening 46 to be raised vertically a sufficient distance upon pivoting of frame 76 for the efficient and effective discharge of particulate lading by gravity. Container 10 of twenty (20) feet in length may contain lading having a weight of around forty-five thousand (45,000) pounds, for example, and upon tilting of frame 76 with loading container 10 thereon, high forces are transmitted by axle 89 to I-beams 58, 60 and side plates 74 through tubular member 72.

It is noted that federal regulations restrict the total weight of a tractor and trailer with a loaded container thereon to eighty thousand (80,000) pounds, and the length of a trailer to forty-two (42) feet. Thus, the weight of the trailer is desired to be at a minimum in order for the container to carry particulate lading of a maximum amount.

The other end 80 of tiltable support frame 76 extends upwardly a substantial amount from adjacent side members 78 in order to provide adequate support for a mounting bracket indicated generally at 90 on the outer surface of end 80. Mounting bracket 90 includes a pair of spaced, angle-shaped support members 91 which are secured at their lower ends to end 80 and extend upwardly therefrom as shown particularly in FIGS. 3 and 6. Braces 92 extend between the upper ends of support members 91 and the upper edge of end 80 to provide reinforcement. The upper ends of support members 91 have a horizontal tubular member 93 secured therebetween. Pintle hooks 94 are secured to the outer surface of end 80 and may be utilized by suitable lift apparatus, if needed.

A mounting bracket generally indicated 95 includes a support plate 96 extending between and secured to I-beams 58 and 60. A pair of lugs 97 extend upwardly from the upper surface of support plate 96 and a hydraulic cylinder or ram indicated generally at 98 has a lower end lug 99 mounted for pivotal movement on pivot pin 100 extending between and secured within lugs 97. A piston rod 101 extending from the upper end of hydraulic cylinder 98 has an end lug 102 mounted for pivotal movement about a pivot pin 103 received in tubular member 93 between the upper ends of support members 91. Thus, upon actuation of hydraulic cylinder 98, end 80 of container support frame 76 is moved upwardly and may be raised and lowered thereby. Hydraulic cylinder 98 is adapted to raise container support frame 76 at a maximum angle of around forty-eight (48) degrees with respect to a horizontal plane and for unloading, the loaded container 10 is normally tilted around three (3) or four (4) degrees above the angle of repose of the particular lading. Many of the plastic ladings have an angle of repose of around thirty-five (35) degrees and thus, the support frame 76 would be raised to an angle of around thirty-seven (37) or thirty-eight (38) degrees, for unloading.

Holddown brackets 104 are provided adjacent end member 82 and holddown brackets 106 are provided adjacent end member 80. Holddown brackets 104, 106 are arranged in vertical alignment with corner fittings 24 on container 10 and releasable connecting pins (not shown) releasably connect corner fittings 24 with aligned holddown brackets 104 and 106 for releasably securing container 10 thereon. It is noted that container 10 while shown as one length, such as twenty (20) feet, for example, may be of different lengths depending upon the weight of the lading being transported. The container 10 is normally loaded to the maximum weight of lading for the transport vehicle and if the lading being transported has a higher unit weight, container 10 could be of a shorter length, such as sixteen (16) or eighteen (18) feet in length, for example, and yet be at the maximum weight limit for the transport vehicle. For transporting containers of different lengths, holddown brackets 106A and 106B shown in FIG. 6 in broken lines may be provided. If desired, holddown brackets 106 could be adjustable along the length of side frame members 78 and move between desired locations at which the holddown brackets could be releasably secured to the associated members 78.

After the loading of plastic bag 26 with particulate lading, the loaded container 10 is transferred by suitable transfer equipment, such as a crane, onto highway vehicle 48 for transport to another site at which the lading is unloaded from container 10.

At the unloading site, a portable throttle valve assembly generally indicated at 108, as shown in FIGS. 8, 9, and 12–15, is provided to control the flow of lading from container 10 upon unloading of the lading from discharge opening 46. Throttle valve assembly 108 includes a main valve body 110 which is positioned in longitudinal alignment with opening 46. The handles 112 are manually rotated to move retainer bars 114 into backing sheet 44 behind the inner surface thereof for retaining throttle valve assembly 108 in position. A fixed mounting bracket generally indicated at 116 is provided on one side of valve body 110 and includes an angle-shaped plate member 117 positioned behind associated frame member 40. Front frame plate member 118 extends from angle-shaped member 117 and fits against the front surface of associated vertical framing member 40. On the other side of main body 110 is an adjustable or telescoping mounting bracket generally indicated at 119 including a pair of fixed bracket members 120 receiving slidable bracket members 121 therein. The outer ends of removable bracket members 121 include an angle-shaped rear plate member 122 engaging the side and rear surfaces of vertical frame member 40. A pair of spaced front plate members 123 extend from member 122 and engage the front surface of frame member 40. Adjusting means 124 secure members 121 in extended position about associated frame member 40.

Valve body 110 includes a lading conduit having a butterfly valve member 125 therein fixed to a shaft 126 having a plate 127 mounted on its upper end. An internal threaded nut 128 is secured to plate 127 in offset relation to shaft 126 and a bracket 130 has an internally threaded nut 132 secured thereon. An externally threaded screw 134 is mounted in threaded engagement with nuts 128 and 132 and has a handle 136 mounted for manual rotation of screw 134. Stop nuts 138 are fixed to shaft 134 and engage nut 132 at fully opened and closed positions of butterfly valve member 125. Thus, the flow of lading from container 10 may be controlled by butterfly valve member 125 upon rotation of handle 136. A plexiglas window 140 is mounted for vertical sliding movement within guides 142. In order to commence the unloading operation, a workman raises plexiglas window 140 and inserts his hand through the opening formed thereby for slitting membrane 38 in bag 26 thereby to start the flow of lading through the conduit in which butterfly valve 125 is mounted. The rate of flow of the lading may be observed through the plexiglas window 140.

Figure 16:
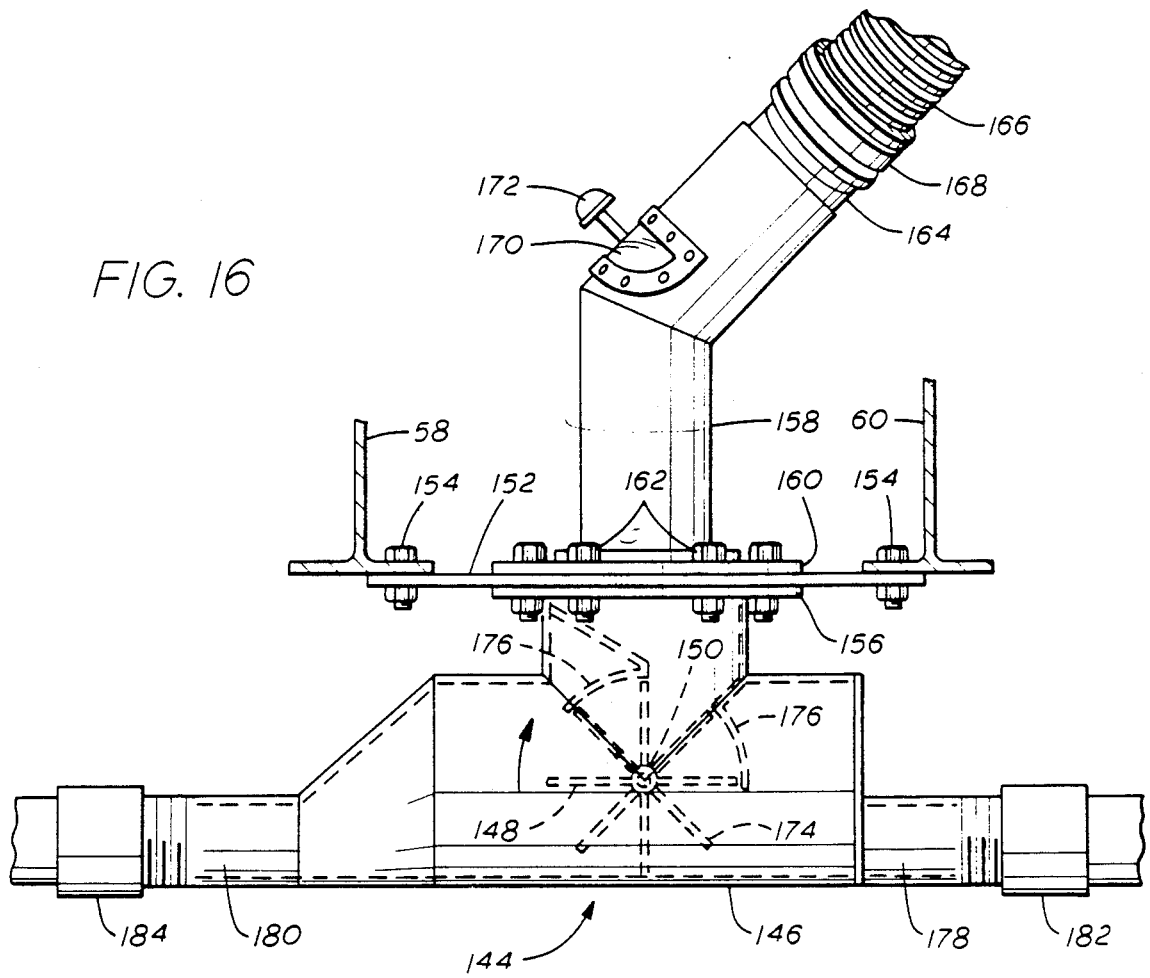
FIG. 16 is a side elevation of a hopper receiving the lading by gravity from the throttle valve assembly and having a rotary valve therein to feed the lading into a high velocity air stream for pneumatic conveyance to a suitable storage facility.
Figure 17:
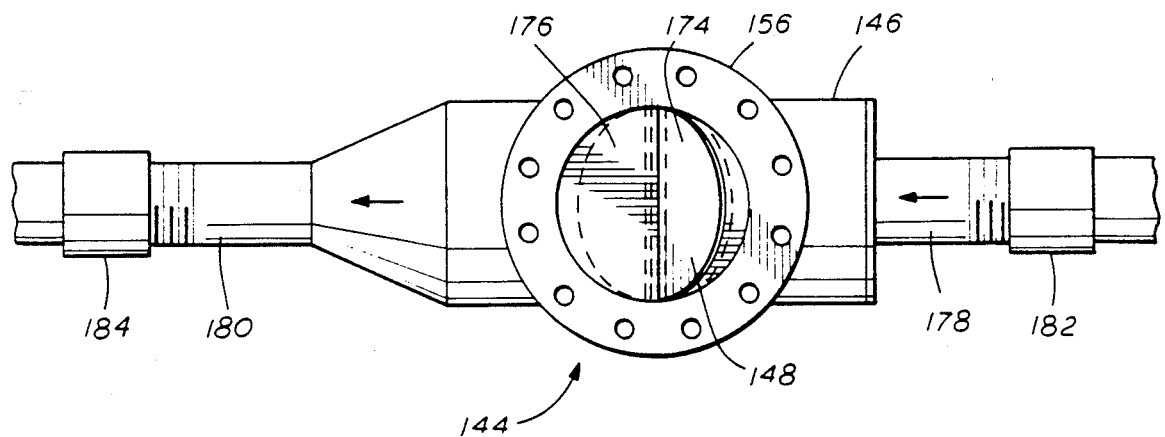
FIG. 17 is a top plan of the hopper arrangement shown in FIG. 16.

Referring to FIGS. 16–17, a hopper structure is generally indicated at 144 into which lading flows by gravity upon being unloaded from container 10. Hopper 144 has a generally inverted T-shaped body 146 with a rotary valve generally indicated at 148 mounted about axis or shaft 150 for rotation within hopper body 146. A horizontal mounting plate 152 extends between and is secured to the lower of flanges of I-beams 58 and 60 by suitable bolt and nut connections indicated at 154. Hopper body 146 has an upper annular flange 156 and a rotary valve intake nozzle indicated at 158 has a mating lower flange 160. Suitable nut and bolt combinations 162 secure flange 156 and 160 to mounting plate 152 for supporting hopper 144 therefrom. Mounting plate 152 has a suitable opening therein to permit the flow of lading from an intake nozzle 158 extending upwardly from flange 160. The upper end of nozzle 158 has a swivel joint 164 and a suitable flexible hose 166 may be removably connected to the end of discharge nozzle 158 by a suitable quick release mechanism illustrated generally at 168. Flexible hose 166 extends to and is releasably connected to throttle valve assembly 108 at container 10. A plexiglas window shown at 170 in nozzle 158 may be utilized to observe the flow of lading through flexible hose 166 into rotary valve 148 and a battery operated light shown at 172 may be provided to observe the flow of lading at night or under obscure lighting conditions.

Rotary valve 148 shown in FIGS. 16 and 17 includes a plurality of vanes or paddles 174 secured to shaft 150 for rotation therewith. Vanes 174 wipe against partitions 176 extending between the sides of hopper body 146 in sealing relation and form pockets therebetween to receive lading falling downwardly by gravity into hopper 144. Vanes 174 seal the lower portion of body 146 from the upper portion thereof and prevent any upward flow of air from hopper 144 into the downward flow of lading from nozzle 158 into the pockets formed between vanes 174. An air inlet conduit 178 is connected to hopper 144 on one side thereof adjacent I-beam 60 and an outlet or discharge conduit 180 is secured to hopper body 146 on an opposed side thereof adjacent I-beam 58. A suitable releasable flexible hose shown at 182 may be connected to air inlet conduit 178 at the discharge or unloading site to supply air to hopper 144 for the movement of the lading to a storage facility, such as a bin, large hopper, or silo where the lading may be stored until required in the manufacturing process for final plastic end products. A suitable, flexible hose shown generally at 184 is releasably connected to the air discharge outlet 180 and leads to a suitable bin or silo for storage.

Figure 10:
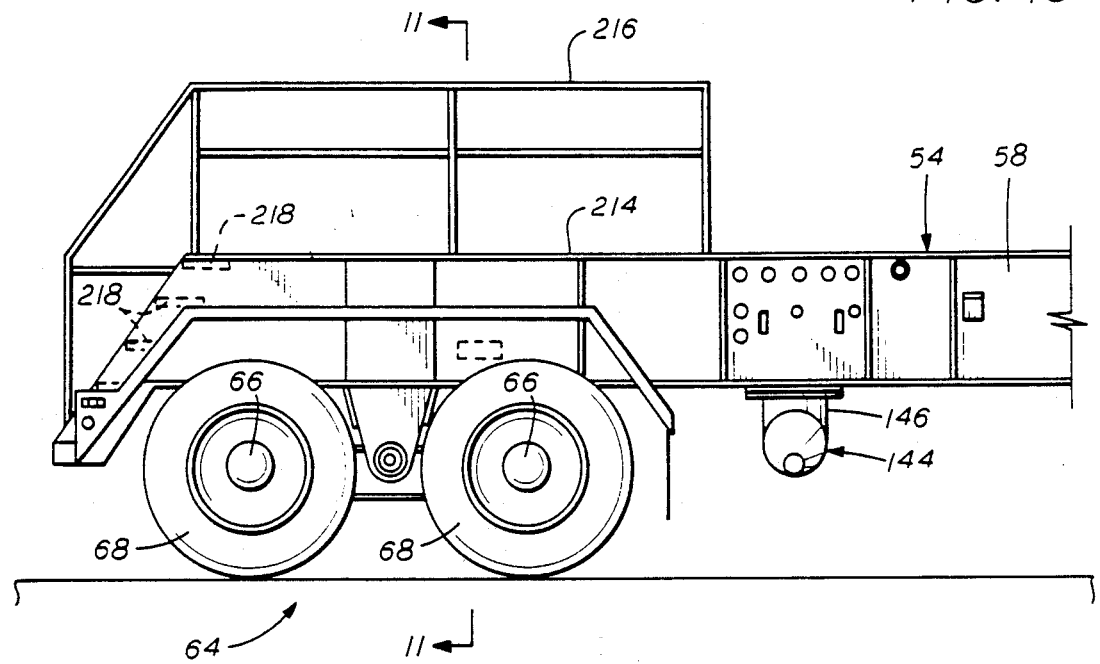
FIG. 10 is an enlarged side elevation of the rear of the highway trailer showing the controls and pneumatic discharge means for the trailer.
Figure 11:
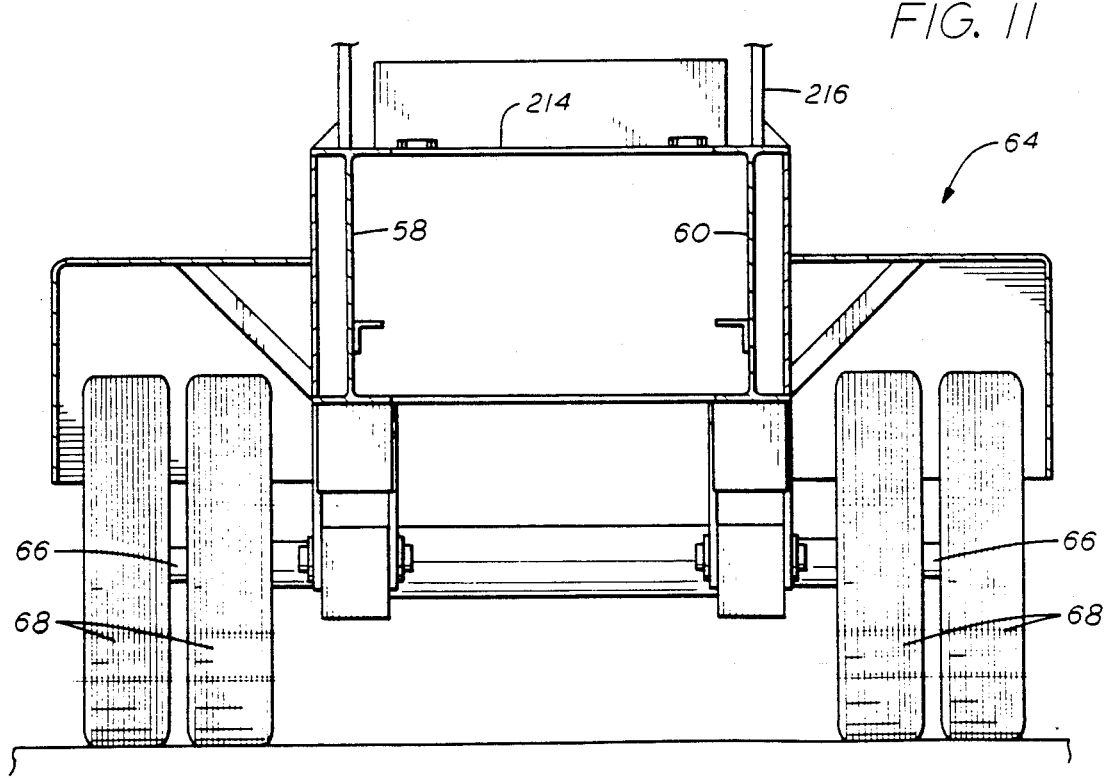
FIG. 11 is a section taken generally along line 11—11 of FIG. 10.
Figure 12:
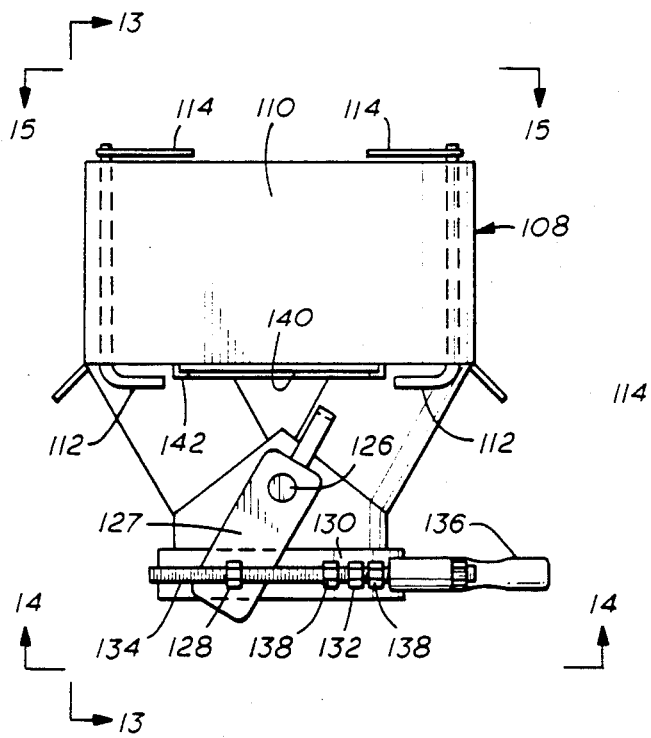
FIG. 12 is a plan view of the throttle valve assembly positioned adjacent the discharge opening of the cardboard backing member to control the flow of plastic particulate lading from the container.
Figure 13:
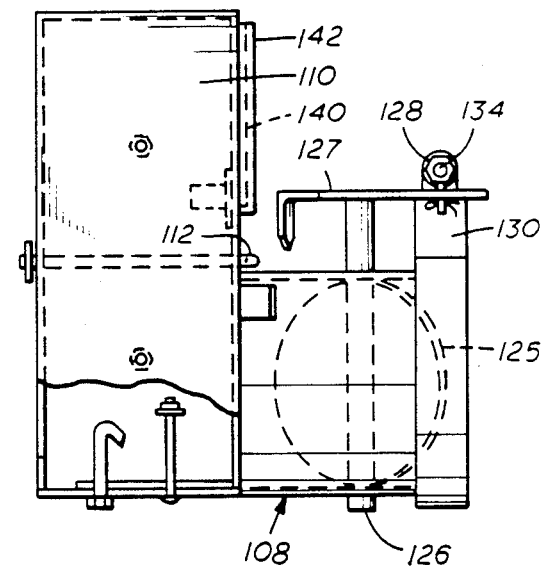
FIG. 13 is a side elevation of the throttle valve assembly shown in FIG. 12 taken generally along line 13—13 of FIG. 12.
Figure 14:
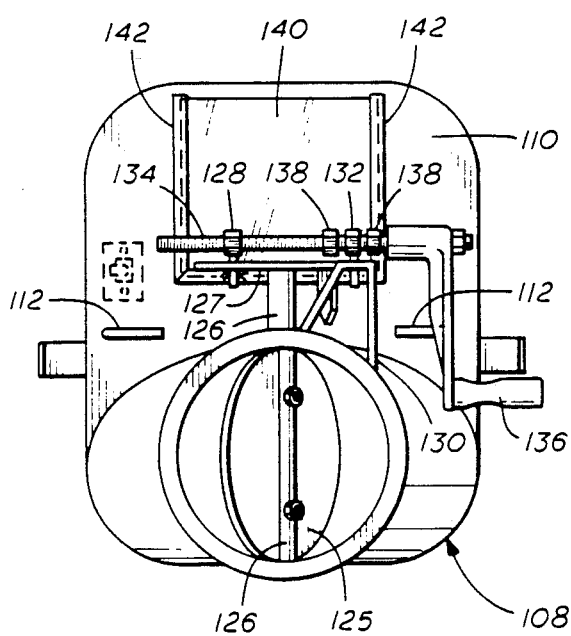
FIG. 14 is a front elevation taken generally along line 14—14 of FIG. 12 and showing the butterfly valve member and means for rotating the valve member.
Figure 15:
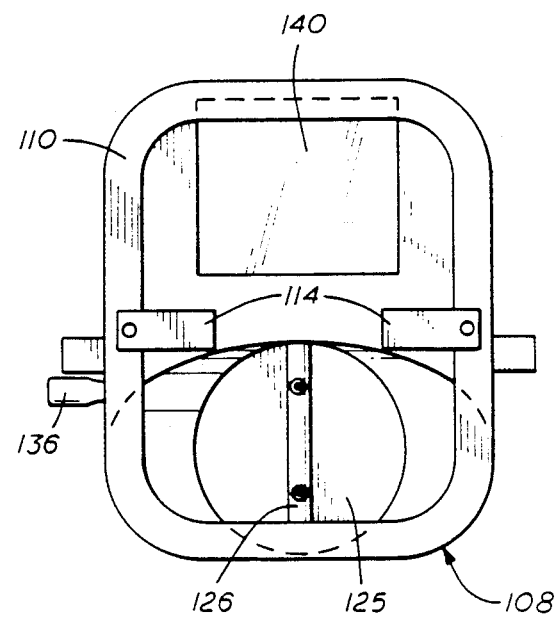
FIG. 15 is a rear elevation looking generally along line 15—15 of FIG. 12 and showing the discharge opening.
Figure 18:
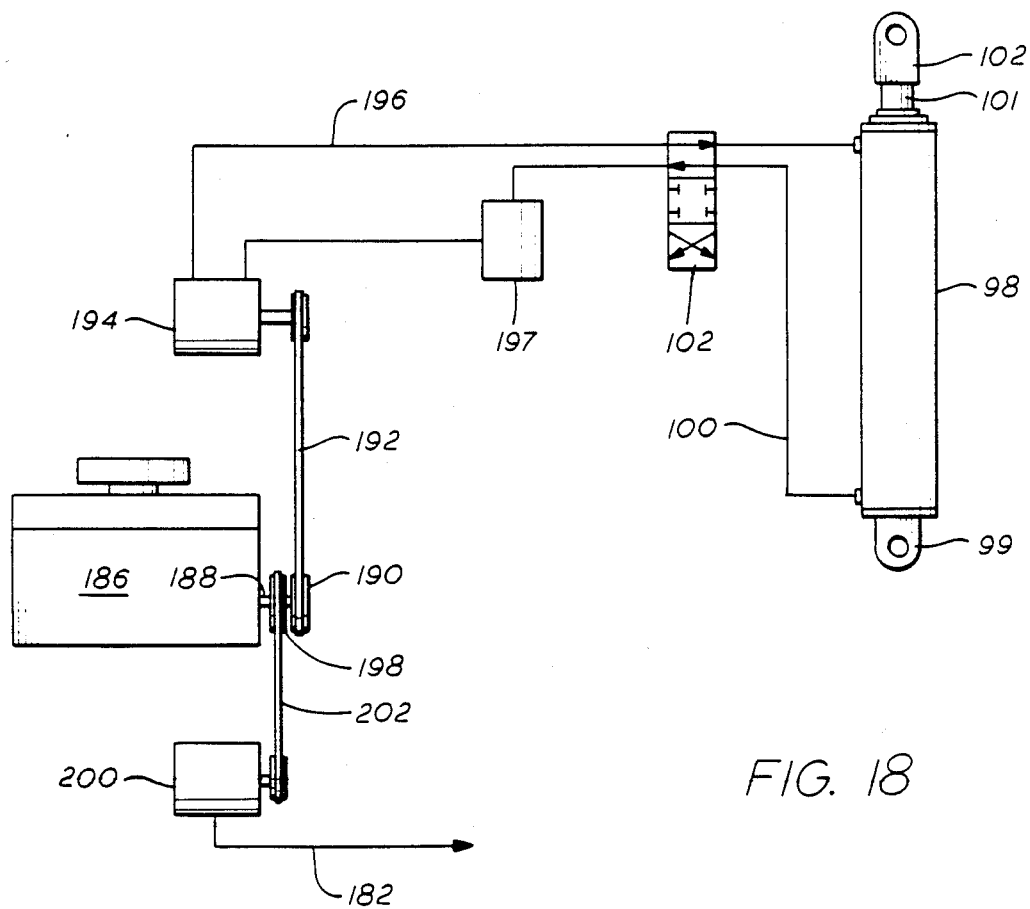
FIG. 18 is a schematic of the means for driving and supplying the hydraulic and air supply sources.
Figure 19:
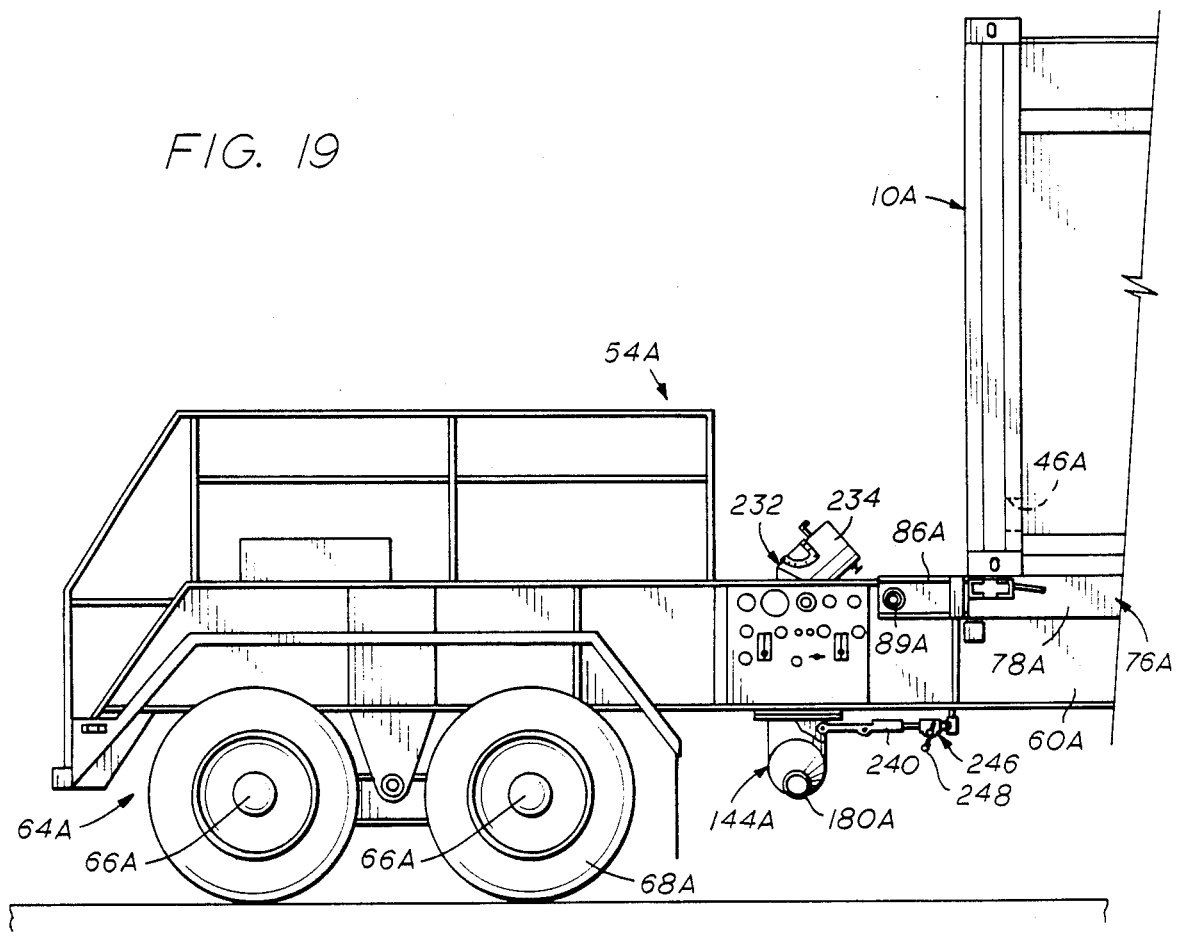
Figure 20:
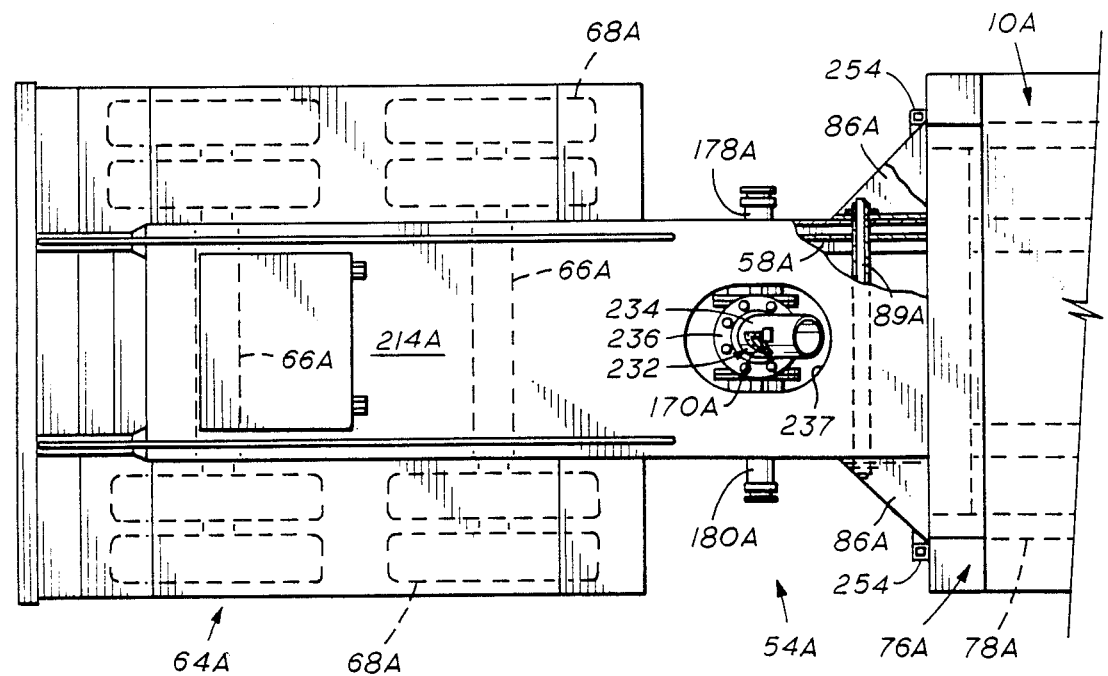
Figure 21:
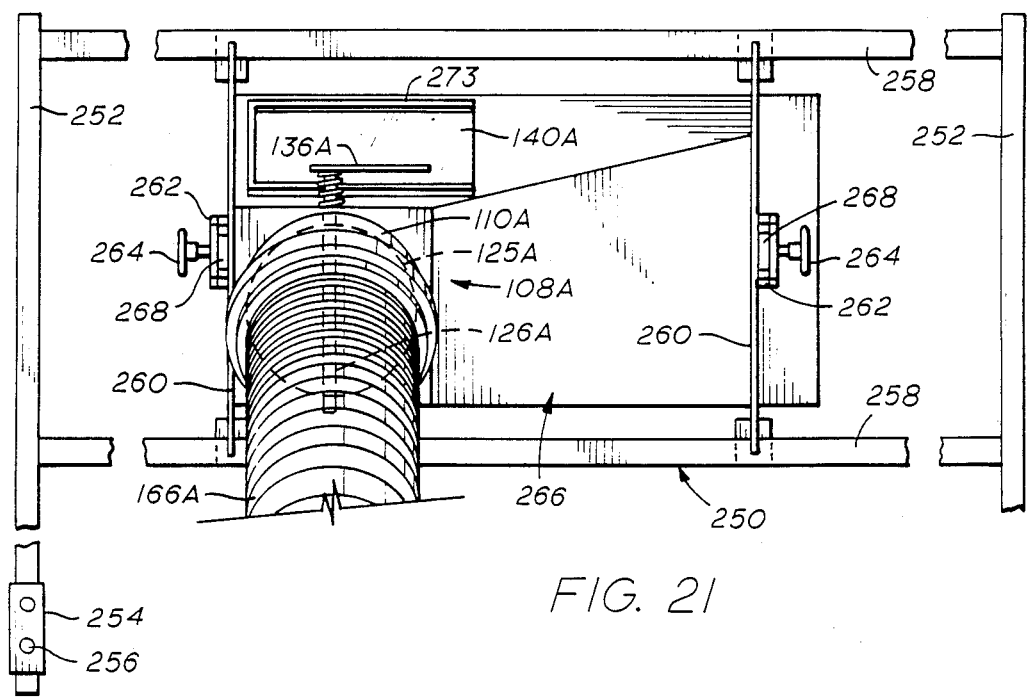
Figure 22:
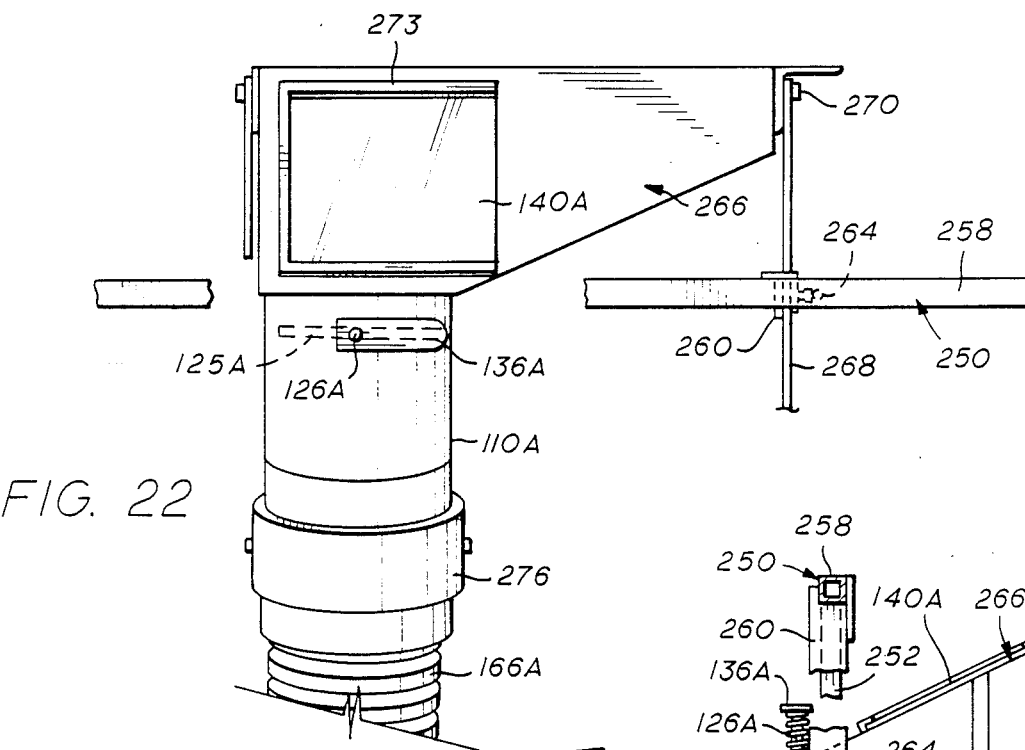
Figure 23:
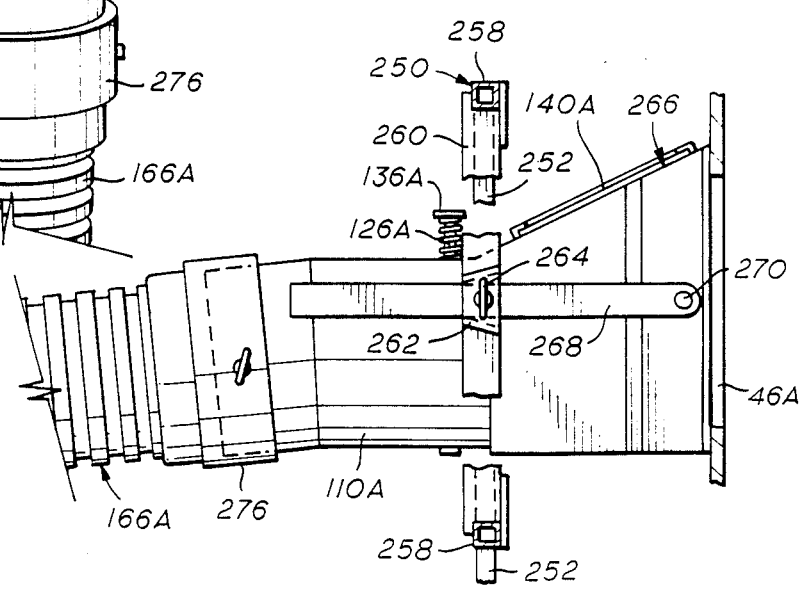

Referring to the rear end portion of trailer 54 shown generally in FIGS. 10 and 11, and to the schematic view on FIG. 18, power equipment and suitable controls are provided thereon for the entire unloading operation at the unloading site. A power drive means is illustrated at 186 comprising a gasoline engine having a drive shaft 188 extending therefrom. A pulley 190 is connected by a drive belt 192 to a hydraulic pump 194 which supplies hydraulic fluid through line 196 to hydraulic cylinder 98. Fluid is returned from hydraulic cylinder 98 to a reservoir 197 through return line 100. A suitable three-way valve indicated at 102 is provided to reverse the flow of fluid to hydraulic cylinder 98 and is illustrated in FIG. 18 in the position for lowering of cylinder 98. A drive sprocket 198 is connected to an air compressor 200 by drive belt 202 and a suitable blower for compressor 200 supplies compressed air to flexible line 182 for providing a high velocity air stream passage through hopper 144 and entraining particulate lading therein for delivery to the storage facility.

It may be desirable to have an alternate source of compressed air such as shown in FIGS. 3 and 6 in which tractor 50 has an air compressor 206 thereon supplying air through a flexible conduit 208 and quick disconnect coupling 210 to air conduit 212 mounted on the outer side of I-beam 60. The end of conduit 212 may be connected to inlet conduit line 178 of hopper 144 to supply air thereto.

As shown particularly in FIGS. 10 and 11, the rear end portion of trailer 54 is particularly adapted to permit workmen to operate in a safe and efficient manner during unloading lading from container 10. A platform 214 s provided between I-beams 58 and 60 with suitable handrails 216 on each side thereof to permit manual gripping by a workman. Steps 218 allow a workman to easily gain access to platform 214 so that upon trailer 54 reaching its unloading site, throttle valve assembly 108 may be easily positioned adjacent discharge opening 46, and suitable hose connections made between throttle valve assembly 108 and hopper 144.

The sequence of steps involved in loading the container 10 at the first site within plastic bag 26 within container 10, then transporting loaded container 10 to a second site for unloading of the plastic lading, and then unloading the plastic lading from container 10 into a storage facility at the second site at which the plastic lading will be utilized for the manufacture of plastic products will now be described.

First, plastic particulate lading is loaded from a suitable flexible unloading hose into the upper tubular extension 32 which is releasably secured about the unloading hose. Upon loading of bag 26, tubular extension 32 is banded by band 34 for maintaining an air-tight relation during transit. After the loading of container 10, doors 16 are latched and then the loaded container 10 is transferred by a suitable crane or the like onto tilting container support frame 36 with corner fittings 24 vertically aligned with holddown brackets 104 and 106. In this position, suitable locking pins releasably secure loaded container 10 to tiltable support frame 76 for transit. Highway vehicle 48 is then driven to the unloading site.

At the unloading site, a workman unlatches one of the end doors 16 to expose discharge opening 46 in cardboard backing member 44. Then, throttle valve assembly 108 is positioned adjacent discharge opening 46 as indicated with tubular extension 36 being received within the valve body 110 adjacent valve 125. After throttle valve assembly 108 has been positioned, flexible hose 166 is connected between hopper 144 and throttle valve assembly 108. Next, air supply hose 182 is releasably connected to air inlet conduit 178 and discharge hose 184 is releasably connected to outlet 180. Then, to commence the flow of plastic lading, a workman raises plexiglas window 140 and manually slits membrane or closure 38 in plastic bag 26 which is positioned adjacent outlet opening 46 and cardboard backing member 44 and lading then enters throttle valve body 108.

Engine 186 is started to supply hydraulic fluid to cylinder 98 for raising container support fame 76 and loaded container 10 thereon to an angle with respect to a horizontal plane at two (2) or three (3) degrees above the angle of repose of the lading. In this position, air compressor 200 is started and air supplied to inlet 178 of hopper 144 for pneumatic unloading of the lading. A workman observes the flow of lading through plexiglas window 140 into the conduit controlled by butterfly valve member 125 and through plexiglas window 170 at rotary valve 148 to determine the amount of buildup of lading at rotary valve 148. Throttle valve 125 is suitably controlled to provide the desired amount of lading to rotary valve 148 for discharge downwardly into the high velocity air stream for conveying to a storage area, such as bins.

As a specific but non-limiting example of unloading utilizing the apparatus and method of this invention, container 10 having a length of twenty (20) feet has forty-five thousand (45,000) pounds of polyethylene pellets loaded therein which have an angle of repose of around thirty-five (35) degrees. Container support frame 76 is tilted to an angle of thirty-eight (38) degrees. Compressed air at a pressure of around four (4) psi is delivered from the blower at seven hundred (700) cubic feet per minute to provide an air velocity of sixty-five hundred (6500) feet per minute through conduit 182, inlet conduit 178, hopper 144, outlet conduit 180, and conduit 184. Conduits 182, 178, 180 and 184 are four (4) inches in diameter and a constant diameter is maintained for the air stream to the final storage facility. Under such conditions, a fully loaded container 10 was unloaded in two and one-half (2½) hours with a negligible amount of lading, less than ten (10) pounds, remaining in the container after unloading. This compares with unloading methods utilized heretofore in the unloading of container 10 with a suction line connected to the container of over four (4) hours while having a substantial amount of lading, over one hundred (100) pounds, remaining in the container after unloading. Thus, a substantial savings in time and in loss of lading by the present transportation system and the present unloading method is provided by the present invention.

FIGS. 19–27 illustrate an improved system for positioning the pneumatic conveying means on the trailer and the lading discharge opening at the rear of the container relative to each other so that a fast gravity flow of lading will result upon tilting of the container on the trailer past the angle of repose of the lading for gravity unloading. The improved system as will be explained further below includes the means and method for connecting the throttle valve assembly to the container and for connecting the detachable lading conduit between the pneumatic conveying means and the throttle valve assembly in a minimum of time and in such a manner as to provide a relatively fast gravity flow of lading from the container upon tilting of the container past the angle of lading repose.

Trailer 54A has a pair of longitudinally extending I-beams 58A and 60A and a rear chassis 64A on which tandem rear axles 66A are mounted. Rear wheels 68A are mounted on axles 66A. A container 10A has a lading discharge opening 46A at its rear. A container support frame 76A includes side members 78A. Gusset members 86A adjacent the rear ends of side members 78A receive an axle or shaft 89A for pivotal movement of container support frame 76A thereabout. Shaft 89A is supported on I-beams 58A and 60A for pivotal movement of container 10A relative to trailer 54A. Axle 89A extends a distance D from the rear end of container 10A preferably around twenty-one (21) inches as shown in FIG. 24. Distance D should be at least around twelve (12) inches from the rear end of container 10A and axle 89A should be mounted a distance D1 below the bottom of container 10A of around four (4) to eight (8) inches in order to provide an adequate predetermined height of discharge opening 46A above the unloading means upon tilting of container 10A for gravity unloading.

It is noted that discharge opening 46A as in the embodiment shown in FIGS. 1–18 is provided in a lower marginal portion of a vertically extending cardboard backing sheet which restrains a plastic bag in which the lading is positioned. Discharge opening 46A is around four (4) inches from the bottom surface of container 10A as the floor of container 10A is around four (4) inches in thickness.

Figure 25:
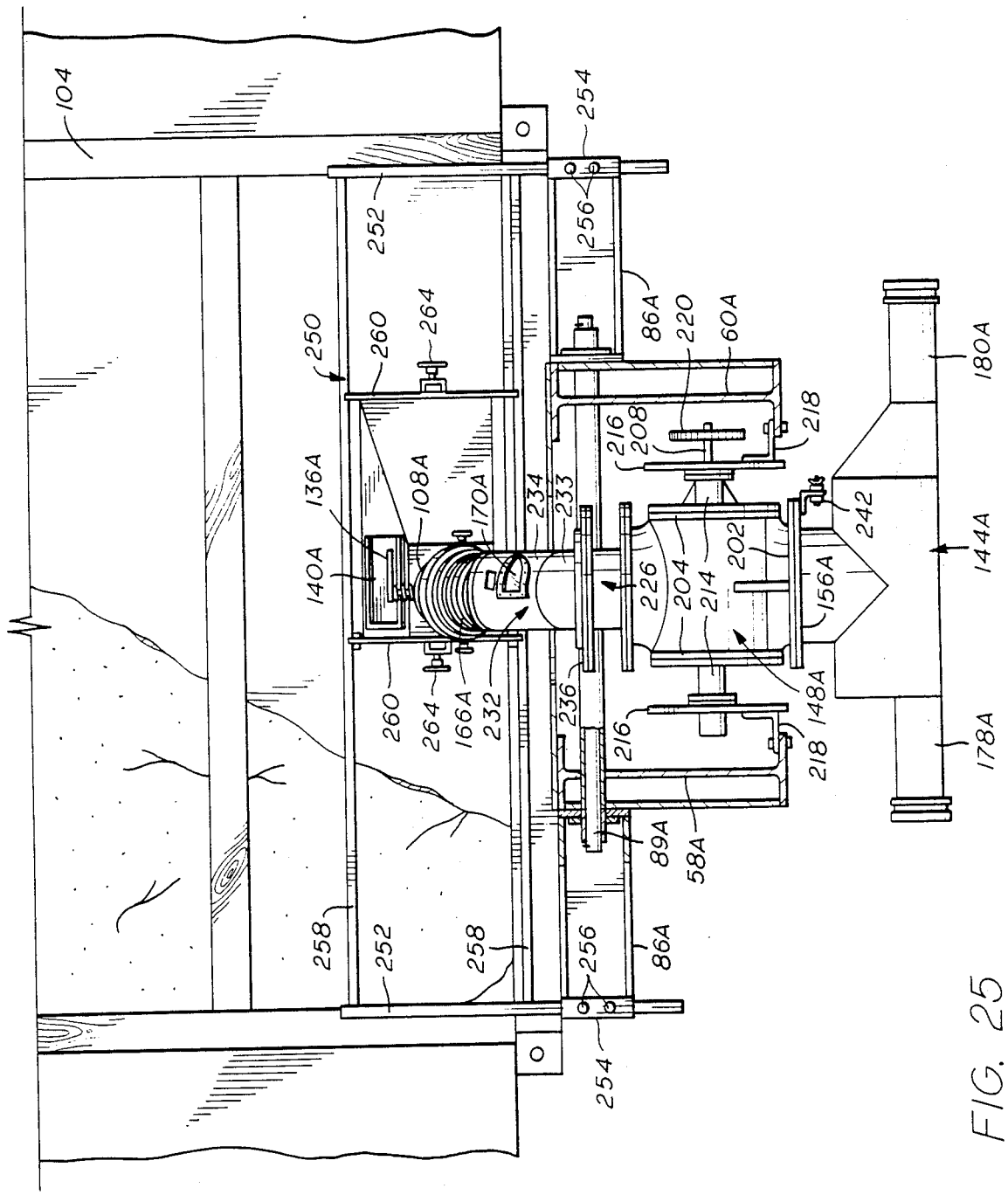

As shown particularly in FIGS. 24, 25 and 27, a T-shaped pneumatic hopper 144A has an integral air inlet conduit 178A and air outlet conduit 180A. Hopper 144A is mounted a substantial distance of at least around one (1) foot rearwardly of the rear end of container 10A and forwardly of rear wheels 68A. It is to be understood that hopper 144A may be mounted forwardly of rear wheels 68A on a single axle, if desired, instead of a pair of rear axles as shown in the drawings. Suitable flexible hoses are connected to conduits 178A and 180A to provide a high velocity air flow to hopper 144A for pneumatic conveyance of the lading from container 10A to a suitable storage facility. Hopper 144A has an upper annular flange 156A and a rotary valve generally indicated at 148A is mounted on flange 156A. Rotary valve 148A has a body 200 with upper and lower flanges 202, and side flanges 204. Lower flange 202 matches and is secured to upper flange 156A of hopper 144A. Rotary valve 156A has a rotor including vanes 206 secured to a shaft 208 and forming pockets 210 between the vanes. A resilient wiper 212 is provided adjacent the top dead center position of rotary valve 148A which wipes excess lading from the op of pockets 210. Shaft 208 fits within bearing sleeves 214 which are secured to plates 216 fixed to brackets 218 mounted on I-beams 58A and 60A. A sprocket 220 is secured to an end of shaft 208 and a sprocket chain 222 connects sprocket 220 with a suitable hydraulic motor shown at 224 for rotation of rotary valve 148A.

To guide the lading to one side of rotary valve 148A for filling a pocket 210, a lading deflector generally indicated at 226 is secured to upper flange 202 of rotary valve 148A and has a lading deflector plate 228 therein for guiding the gravity flow of lading into the throat provided adjacent resilient wiper or lip 212. Mounted for rotary or swivel movement upon upper annular flange 230 of lading deflector 226 is a receiver generally indicated at 232. Receiver 232 includes a lower vertical section 233 and an upper inclined section 234. Lower section 233 has an annular flange 235 at its lower end mounted for swivel movement within an annular slot formed by Z-shaped retaining bracket 236 secured to upper flange 230 of deflector 226. Platform 214A over I-beams 58A and 60A has an opening 237 through which receiver 232 extends. A plexiglas window 170A is mounted on conduit section 234 for viewing lading flow into rotary valve 148A.

Receiver 232, lading deflector 226, and pneumatic hopper 144A are all supported by rotary valve 148A on shaft 208. For easily connecting detachable lading conduit 166A between receiver 232 and container 10A at the unloading site while mounting container 10A so that it obtains an adequate height above receiver 232 when the container is tilted for gravity unloading, it is desirable to be able to move the upper end of receiver 232 toward and away from container 10A. For this purpose rotary valve 148A is mounted for pivotal movement about shaft 208 relative to the trailer. To effect movement of rotary valve 148A and the upper end of receiver 232, an internally threaded sleeve 240 is pivotally mounted at 242 to pneumatic hopper 144A. An externally threaded shaft 244 is threadedly received within sleeve 240 and a manual actuator generally indicated at 246 is secured by angle 247 to the lower flange of I-beam 60A. Manual actuator 246 includes a crank 248 connected to a worm engaging a worm wheel secured to shaft 244 for rotation of shaft 244 as well known to move rotary valve 148A and receiver 232 about shaft 208. Thus, the upper end of receiver 232 may be moved back and forth for positioning at a predetermined relation with respect to the discharge opening 46A of container 10A and the subsequent connection of flexible lading conduit 166A between receiver 232 and bottom discharge opening 46A.

Upon arrival at the unloading site and prior to the connection of flexible lading conduit 166A, a vertically extending support frame generally indicated at 250 is mounted on container support frame 76A after the opening of the rear door on container 10A. Support frame 250 includes a pair of vertical frame members 252 having lower ends that are received within sleeves 254 secured to the rear corners of container frame 76A. Suitable set screws 256 releasably secure frame 250 to container support frame 76A adjacent the rear end of container 10A. Horizontally extending frame members 258 extend between vertical frame members 252 and intermediate support members 260 extend between horizontal frame members 258. Intermediate frame members 260 have receiving slots formed thereon by suitable brackets 262 and set screws 264 thereon.

A throttle valve assembly shown at 108A is then mounted on vertical support frame 250 adjacent discharge opening 46A of container 10A. Throttle valve assembly 108A includes a tubular valve body 110A in which is mounted a butterfly valve member 125A. A shaft 126A secured to valve member 125A has an outer handle 136A thereon for manually controlling butterfly valve member 125A. An outwardly flared open ended lading receiving hood generally indicated at 266 fits about discharge opening 46A of container 10A for funneling lading from container 10A through the tubular body 110A of throttle valve 128A. A pair of arms 268 are pivoted at 270 to hood 266 and have their ends received within slots formed by brackets 262 on intermediate frame members 260. Hood 266 is accurately positioned by a workman adjacent and in horizontal alignment with discharge opening 46A, and while held tightly against container 10A, set screws 264 are manually tightened against arms 268 for holding throttle valve assembly 108A in position. A plexiglas window 140A is slidably mounted in a holder 273 on the upper wall of hood 266 for viewing the flow of lading from container 10A and to permit manual access to the plastic bag containing the lading.

After positioning of throttle valve assembly 108A, a detachable lading conduit generally indicated at 166A is connected between receiver 232 and throttle valve assembly 108A. Detachable flexible lading conduit generally indicated at 166A has rigid sleeves 274 and 276 on opposite ends thereof and sleeve 274 fits within the open end of conduit section 234 of receiver 232 and is suitable secured therein by set screws. Then, for accurately positioning of sleeve 276 on the other end of flexible conduit 166A for fitting about the end of valve body 110A, the upper end of conduit section 238 is pivoted about shaft 208 by rotation of hand crank 248. Next, sleeve 276 is fitted over tubular body 110A and secured thereto by suitable releasable locking means. After this connection, plexiglas window 140A may be opened for commencing the gravity flow of lading by manual slitting of the plastic bag in which the lading is sealed. Then, the container support frame 76A and container 10A thereon are tilted about shaft 208 by actuation of the associated hydraulic cylinder to an angle greater than the angle of repose of the particulate lading to be unloaded. This angle indicated at A in FIG. 26 may be around forty (40) to forty-five (45) degrees and upon pivoting about shaft 89A, discharge opening 46A moves closer to receiver 232. For this reason, during the tilting of container frame 76A, hand crank 248 is simultaneously actuated to move receiver 232 in a rearward direction so that adequate spacing between receiver 232 and throttle valve assembly 108A is maintained without excessive deformation of flexible conduit 166A.

It is noted particularly as shown in FIG. 26 that discharge opening 46A is positioned at an angle B preferably of around forty-five (45) degrees with respect to receiver 232. Angle B is shown for container 10A in a tilted position for unloading and should be at least equal to the angle of repose of the lading being unloaded for best unloading results. It is noted that receiver 232 as shown in FIG. 27 includes upper inclined section 234 which is at an angle of forty-five (45) degrees with respect to vertical section 233 leading to rotary valve 148A. Thus, the entire gravity flow path of the lading from discharge opening 46A to the upper end of rotary valve 148A is preferably at an angle at least equal to the angle of repose of the lading for the best unloading rate. In order to obtain a continuous gravity flow path above the angle of repose of the lading, it is necessary to have discharge opening 46A at a sufficient height D2 as shown in FIG. 26 above the upper end of rotary valve 148A to achieve the desired slope. A minimum height D2 of around eighteen (18) inches is believed necessary and an optimum height D2 of around thirty (30) inches is desirable. A fast gravity flow of lading is thereby maintained between container 10A and receiver 232 for feeding the particulate lading to rotary valve 148A and thence to pneumatic hopper 144A for pneumatic conveyance to a suitable storage site or the like.

An angle B of at least around thirty (30) degrees is believed to be required for most particulate ladings in order to obtain a desired rate of gravity flow from container 10A.

Receiver 232 and hopper 144A may be pivoted about shaft 208 an angle C as shown in FIG. 26 of preferably around fifteen (15) degrees in opposite directions from a centered position in order to obtain the desired movement for making the connection between receiver 232 and throttle valve assembly 108A. An angle C of at least around ten (10) degrees is believed to be required for best results.

A review of the operation of an unloading cycle is described below with the trailer being positioned at an unloading site for unloading the lading from the container by gravity and pneumatic conveyance to a suitable storage facility adjacent the trailer, such as an adjacent storage bin or silo. Support frame 250, flexible lading conduit 166A, and throttle valve assembly 108A all of which are detachable are normally transported by the trailer but could be available at the unloading site. First, the rear doors of container 10A are opened and vertically extending support frame 250 is mounted on container support frame 76A. Next, control valve assembly 108A is pushed tightly against the cardboard backing in container 10A forming discharge opening 46A and is secured thereagainst by set screws 264. Then, flexible lading conduit 166A is mounted between receiver 232 and throttle valve assembly 108A while hand crank 248 is actuated for positioning the upper end of receiver 232 at a desired position with respect to discharge opening 46A. Next, a suitable air inlet hose is connected to air inlet conduit 178A for supplying high velocity air thereto for conveyance of the particulate material fed into pneumatic hopper 144A, and a suitable discharge hose is connected from outlet 180A to the storage facility. Plexiglas window 140A is opened and the plastic bag for the lading is opened for commencing the flow of lading. Then, container support frame 76A and container 10A are pivoted to the desired angle A while hand crank 248 is actuated for movement of the upper end of receiver 232 away from the rear end of container 10A as the container is being tilted. Hydraulic motor 224 is then started for rotation of rotary valve 140A, and butterfly valve 125A is opened for feeding of the lading, such as plastic pellets, into hopper 144A for pneumatic conveyance. A fast gravity flow of lading from container 10A is obtained resulting particularly from the position of discharge opening 46A relative to receiver 232 and rotary valve 148A.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. Unloading apparatus on a highway trailer for unloading particulate lading from a discharge opening in a container supported on the highway trailer adjacent a rear end door of the container and discharging the lading into a high velocity air stream for movement of the lading to a storage facility, said unloading apparatus positioned horizontally between the rear wheels of the highway trailer and the rear end of the container and comprising:

a throttle valve assembly removably attached to the container adjacent said discharge opening upon opening of said rear end door and adapted to receive laying by gravity from said container through said discharge opening;

means on the container for accurately positioning the throttle valve assembly to the discharge opening of the container;

pneumatic conveying means mounted on said trailer horizontally between the rear wheels of the highway trailer and the rear end of the container and vertically below the container and adjacent the rear wheels of the highway trailer, said pneumatic conveying means having a high velocity air stream therein for conveying the lading to storage facility;

a detachable and flexible lading conduit extending between said throttle valve assembly and said pneumatic conveying means; and a rotary valve adjacent said pneumatic conveying means to feed said lading from said lading conduit into said high velocity air steam.

2. Unloading apparatus as set forth in claim 1 wherein a transparent window is provided for said throttle valve assembly for a workman to observe the flow of lading from the container to the throttle valve assembly.

3. Unloading apparatus as set forth in claim 1 wherein a transparent window is provided adjacent said rotary valve for a workman to observe the flow of lading into the rotary valve from the throttle valve assembly.

4. Unloading apparatus as set forth in claim 1 wherein said throttle valve assembly includes a butterfly valve member and manually operated means for rotating said butterfly valve member to control the flow of lading from said container.

5. Unloading apparatus as set forth in claim 1 wherein said rotary valve comprises a rotary shaft and a plurality of vanes extending radially from said shaft to form pockets for the lading between adjacent vanes.

6. A highway trailer for the gravity unloading of particulate lading from a detachable container supported on the highway trailer, the lading being sealed within a flexible bag within the container and adapted for gravity discharge therefrom through a bottom discharge opening in a backing member adjacent a rear end door of the container, said highway trailer having:
   an elongate body including a pair of parallel longitudinally extending beams and rear wheels supporting the body for movement;
   a throttle valve assembly removably attached to the container adjacent said discharge opening in said backing member after opening of said end door and adapted to receive lading by gravity from said bag through said discharge opening;
   means on the container for accurately positioning the throttle valve assembly to the discharge opening of the container;
   pneumatic conveying means mounted horizontally on said trailer between the rear wheels and the rear end of the container and having a high velocity air stream moving therethrough for conveying the lading to a storage facility;
   a detachable and flexible lading conduit extending between said throttle valve assembly and said pneumatic conveying means;
   valve means positioned between said parallel beams over said pneumatic conveying means to feed said lading from said lading conduit into said high velocity air stream; and
   means on said trailer to tilt said container at an angle above the angle of repose of the laying within the container to provide a gravity flow of lading into the throttle valve assembly for a controlled flow to the pneumatic conveying means.

7. A highway trailer as set forth in claim 6 wherein the flexible bag within said container has a lower tubular extension therein adjacent said discharge opening in said backing member and a closure covers the inner end of said tubular extension, said closure being opened manually to commence the gravity flow of lading from said container.

8. A highway trailer as set forth in claim 6 wherein said backing member is formed of a corrugated cardboard material and said throttle valve assembly has manually actuated securing means to engage said corrugated material and hold said throttle valve assembly tightly against said backing member in longitudinal alignment with said discharge opening.

9. A highway trailer as set forth in claim 6 wherein an air compressor is mounted on said trailer to provide air to said pneumatic conveying means in a high velocity air stream.

10. A highway trailer as set forth in claim 6 wherein a container support frame is pivotally mounted about its rear end on said beams at horizontal location between the rear end of said container and said rear wheels of said trailer, the loaded container being supported on said support frame for movement therewith; and
   a hydraulic cylinder is mounted between the front end of said support frame and elongate body for tilting of said support frame and said container mounted thereon.

11. A highway trailer for the gravity unloading of particulate lading from a detachable container of around twenty (20) feet in length supported on the highway trailer, the lading being sealed within a flexible bag within the container and adapted for gravity discharge therefrom through a bottom discharge opening in a backing member adjacent a rear end door of the container, said highway trailer being a semi-trailer over around forty (40) feet in length and comprising:
   an elongated body including a pair of parallel longitudinally extending beams extending generally along substantially the entire length of the trailer and having rear tandem support wheels;
   a container support frame pivotally mounted about its rear end on said beams at a horizontal location between the rear end of said detachable container supported on the support frame and the rear wheels of said trailer;
   a hydraulic cylinder between said elongate body and the front end of the container support frame for raising said front end for pivotal movement about its pivotal rear mounting for tilting the loaded container to an angle above the angle of repose of the lading within the container for a gravity discharge of lading from said discharge opening adjacent the rear end door of said container;
   a pneumatic hopper positioned between said beams between the rear end of said container and said rear wheels at a position below and horizontally spaced from the rear end of the container;
   a rotary control valve mounted between said beams over the pneumatic hopper to control the flow of lading into the pneumatic hopper;
   a flexible detachable lading conduit between the rotary control valve and said discharge opening in said backing member to direct the flow of lading from the container to the rotary valve;
   a throttle control valve in said detachable conduit to control the flow of laying from the container to the rotary valve; and
   means on the container support frame for accurately positioning the throttle control valve to the discharge opening in said backing member.

12. A highway trailer as set forth in claim 11 wherein a baffle plate is mounted in said conduit over said rotary control valve to deflect and direct the flow of lading toward a desired side of said rotary control valve.

13. A highway trailer as set forth in claim 11 wherein said elongated body has a rear end portion thereof over said rear wheels and a platform is positioned thereon spaced rearwardly from said container and from said container support frame to support a workman thereon for detachably connecting said flexible detachable lading conduit to said container adjacent said lading discharge opening.

14. A highway trailer as set forth in claim 13 wherein a hydraulic pump is mounted on said body to supply hydraulic fluid to said hydraulic cylinder; and
   an internal combustion engine is mounted on the rear end portion of said elongate body for driving said hydraulic pump.

15. A highway trailer as set forth in claim 11 wherein means mount said pneumatic hopper and said rotary valve on said beams for pivotal movement about a horizontal axis in a generally vertical plane parallel to the longitudinal axis of said elongate body, said means mounting said rotary valve for pivotal movement at least around ten (10) degrees in opposite directions with respect to a dead center position of the rotary valve for movement of the upper end of the rotary valve toward and away from the rear end of the container.

16. A highway trailer for the gravity unloading of particulate lading from a detachable intermodal container removably supported on the highway trailer, the lading being sealed within a flexible bag within the container and adapted for gravity discharge therefrom through a bottom discharge opening in a backing member adjacent a rear end door of the container, said highway trailer having:

an elongate body having rear wheels and longitudinally extending support members supported on said rear wheels;

an elongate container support frame mounted over said support members and adapted to releasably support a removable container thereon;

means mounting the rear end of said container support frame for pivotal movement relative to said elongate body;

powder means connected between said body and the front end of said container support frame for raising said front end about said pivotal mounting means for tilting said container support frame relative to said body for gravity unloading of the container;

a rotary valve mounted on said elongate body at a position spaced rearwardly of and below the rear end of the container;

a throttle valve assembly adapted for mounting on the container support frame adjacent the bottom discharge opening in said container to control the gravity flow of lading from the container upon tilting of the container support frame beyond the angle of repose of the lading;

means on the container support frame for accurately positioning the throttle valve assembly to the discharge opening;

a flexible lading conduit detachably connected between the throttle valve assembly and the rotary valve and extending from the rotary valve at an angle with respect to the horizontal at least around thirty (30) degrees when said container support frame is tilted beyond the angle of repose of the lading to provide an adequate gravity flow of the lading to the rotary valve for a relatively fast gravity unloading of the lading from the container; and a pneumatic hopper beneath the rotary valve to receive the lading from the rotary valve for pneumatic unloading.

17. A highway trailer as set forth in claim 16 wherein means mount said rotary valve for pivotal movement on said body in a generally vertical plane extending longitudinally of said body with the upper end of said rotary valve being movable toward and away from the rear end of said container upon said pivotal movement.

18. A highway trailer as set forth in claim 17 wherein said means mounting said rotary valve for pivotal movement on said body comprises a generally horizontally extending shaft, and means mount said shaft for manually controlled pivotal movement at least around ten (10) degrees in opposite directions from a neutral dead center position of thee rotary valve.

19. A highway trailer for the gravity unloading of particulate lading from a detachable intermodal container of around twenty (20) feet in length removably supported on the highway trailer, the lading being adapted for gravity discharge through a bottom discharge opening adjacent a rear end door of the container, said highway trailer having:

an elongate body having a pair of horizontally spaced rear axles thereon with associated rear wheels and a pair of longitudinally extending support members supported on said rear wheels;

an elongate container support frame mounted over said support members and adapted to releasably support a removable container thereon;

means mounting the rear end of said container support frame for pivotal movement relative to said elongate body along a horizontal axis spaced horizontally rearward of the rear end of said container;

power means connected between said body and the front end of said container support frame for raising said front end about said pivotal mounting means for tilting said container support frame and container thereon relative to said body for gravity unloading of the container;

a rotary valve on said elongate body at a position spaced rearwardly of and below the pivotal mounting of said container support frame and the rear end of the container;

means mounting the rotary valve between the longitudinally extending support members at a horizontal location between the rear wheels of the body and the pivotal mounting of the container support frame;

a throttle valve adapted for mounting on the container support frame adjacent the bottom discharge opening in said container;

means on the container support frame for positioning the throttle valve with the discharge opening;

means to manually adjust the opening of said throttle valve to control the gravity flow of lading from the container upon tilting of the container support frame beyond the angle of repose of the lading;

a flexible lading conduit detachably connected between the throttle valve and the rotary valve extending from the rotary valve at an angle with respect to the horizontal when said container support frame is tilted beyond the angle of repose of the lading sufficient to provide a desired gravity flow of the lading to the rotary valve for a relatively fast gravity unloading of the lading from the container; and a pneumatic hopper beneath the rotary valve to receive the lading from the rotary valve for pneumatic unloading.

20. A highway trailer as set forth in claim 19 wherein said angle of said flexible conduit between the rotary valve and the throttle valve is between thirty (30) degrees and sixty (60) degrees.

21. A highway trailer as set forth in claim 20 wherein means mount said rotary valve on said body for pivotal movement about a horizontal axis in a generally vertical plane with the upper end of said rotary valve being movable toward and away from the rear end of said container upon said pivotal movement thereby to assist for the attachment and detachment of the flexible lading conduit between the throttle valve and the rotary valve.

22. A highway trailer as set forth in claim 20 wherein support means for said throttle valve are provided on said container support frame; and means mount said throttle valve on said support means for adjustment in both transverse and longitudinal directions relative to said support frame for accurately positioning of said throttle valve relative to the discharge opening in said container.

23. A highway trailer as set forth in claim 22 wherein said support means includes connected frame members having a pair of spaced vertical support members; and means mount said vertical support members for vertical adjustment relative to said container support frame thereby to vary the height of said throttle valve relative to the discharge opening in s id container.

24. A highway trailer for the gravity unloading of particulate lading from a detachable intermodal container of around twenty (20) feet in length removably supported on the highway trailer, the lading being adapted for gravity discharge through a bottom discharge opening adjacent a rear end door of the container; said highway trailer having:

an elongate body having rear wheels and longitudinally extending support members supported on said rear wheels;

an elongate container support frame mounted over said support members and adapted to releasably support a removable container thereon;

means mounting the rear end of said container support frame for pivotal movement relative to said elongate body about a horizontal axis spaced horizontally rearwardly of the rear end of said container;

power means connected between said body and the front end of said container support frame for raising said front end about said pivotal mounting means for tilting said container support frame and container thereon relative to said body for gravity unloading of the container;

a rotary valve mounted on said elongate body at a position spaced rearwardly of and below the rear end of the container;

a lading conduit detachably connected between the bottom discharge opening of the container and the rotary valve and extending from the rotary valve at an angle with respect to the horizontal sufficient to provide an adequate gravity flow of the lading to the rotary valve for a relatively fast gravity unloading of the lading from the container;

a pneumatic hopper beneath the rotary valve to receive the lading from the rotary valve for pneumatic unloading;

support means on said container support frame to support said flexible lading conduit; and means mounting said lading conduit for adjustment on said support means in both transverse and longitudinal directions relative to said container support frame for accurately positioning said lading conduit relative to the discharge opening in said container.

25. A highway trailer as set forth in claim 24 wherein said support means includes connecting frame members having a pair of spaced vertical support members;

a throttle valve adapted for mounting on the container support frame adjacent to discharge opening in said container; and means mount said vertical support members for vertical adjustment relative to said container support frame thereby to vary the height of said throttle valve relative to the discharge opening in said container.

26. A highway trailer as set forth in claim 24 wherein means mount said rotary valve on said body for pivotal movement about a horizontal axis in a generally vertical plane with the upper end of said rotary valve being movable toward and away from the rear end of said container upon said pivotal movement thereby to assist for the attachment and detachment of the lading conduit between the throttle valve and the rotary valve.

27. A highway trailer as set forth in claim 26 wherein said means mounting said rotary valve for pivotal movement on said body comprises a generally horizontal shaft secured to said rotary valve, and means connected to said shaft for manual rotation of said shaft at least around ten (10) degrees in opposite directions from a neutral dead center position of the rotary valve, said means connected to said shaft including a manually operated crank for a predetermined controlled rotation of said shaft to assist in the attachment of said conduit between the container and the rotary member.

28. A highway trailer as set forth in claim 27 wherein a swivel connection is provided between said rotary valve and said conduit to assist in the attachment of said conduit between the container and the rotary valve.

29. A highway trailer as set forth in claim 24 wherein the discharge opening in said container is at least around eighteen (18) inches above the upper end of said rotary valve and the horizontal pivot axis of said container support frame is spaced horizontally rearwardly of the rear end of said container a distance of at least around one (1) foot.

30. A highway trailer for the gravity unloading of particulate lading from a detachable intermodal container of around twenty (20) feet in length removably supported on the highway trailer, the lading being adapted for gravity discharge through a bottom discharge opening adjacent a rear end door of the container; said highway trailer having:

an elongate body having rear wheels and longitudinally extending support members supported on said rear wheels;

an elongate container support frame mounted over said support members and adapted to releasably support a removable container thereon;

means mounting the rear end of said container support frame for pivotal movement relative to said elongate body about a horizontal axis spaced horizontally rearwardly of the rear end of said container;

power means connected between said body and the front end of said container support frame for raising said front end about said pivotal mounting means for tilting said container support frame and container thereon relative to said body for gravity unloading of the container;

a lading control valve mounted on said elongate body at a position rearwardly of and below the rear end of the container receiving lading by gravity from the container;

a pneumatic hopper adjacent the control valve to receive lading from the control valve for pneumatic unloading with said control valve forming an air lock between the pneumatic hopper and the container;

a flexible lading conduit having opposed ends detachably connected between the control valve and the bottom discharge opening of the container; and support means on the container support frame for supporting the other opposite end of the flexible conduit adjacent the bottom discharge opening of the container, said support means including means for accurately positioning said flexible lading conduit relative to the discharge opening in said container.

31. A highway trailer as set forth in claim 30 wherein the discharge opening in said container is at least around eighteen (18) inches above the upper end of said lading control valve and the flexible lading conduit extends from the control valve to the discharge opening at an angle with respect to the horizontal of at least around thirty (30) degrees when said container support frame is tilted beyond the angle of repose of the lading thereby to provide a relatively fast rate of lading flow for gravity unloading of the container in a minimum of time.

32. A highway trailer adapted to transport a loaded container from one location where the container is loaded with particulate lading to another location where the particulate lading is unloaded from the container and comprising:

a chassis having wheels on its rear end portion and an elongate body including a pair of parallel longitudinally extending support members supported on said wheels;

an elongate container support frame mounted over said support members and adapted to releasably support a removable container thereon;

means mounting the rear end of said container support frame on said body for pivotal movement relative to said elongate body for gravity unloading of the container from a rear discharge opening therein upon tilting of the frame and container thereon to a predetermined angle;

a rotary valve mounted on said body between said pair of support members rearwardly of and below the rear end of the container on the container support frame;

a pneumatic hopper secured to the rotary valve for movement therewith and receiving lading from the rotary valve for pneumatic conveyance; and means mounting the rotary valve and pneumatic hopper on the support members for relative pivotal movement about a horizontal axis in a generally vertical plane with the upper receiving end of said rotary valve being movable toward and away from the rear discharge opening in the container upon said pivotal movement.

33. A highway trailer as set forth in claim 32 wherein a flexible conduit has its ends secured between said rear discharge opening of said container and said rotary valve for the gravity feeding of lading from the container to the rotary valve, said flexible conduit extending at an angle from the rotary valve over at least around thirty (30) degrees with respect to the horizontal upon tilting of the container beyond the angle of repose of the laying therein for unloading the lading.

34. An improved method of gravity unloading of particulate lading from a rear discharge opening in a removable intermodal container mounted on a pivoted container support frame of a trailer upon tilting of the container and support frame beyond the angle of repose of the lading within the container comprising the steps of:

placing a vertically extending lading conduit support frame on the container support frame adjacent the rear end of the container;

positioning a throttle valve assembly carried by said support frame adjacent the rear discharge opening of said container and securing the throttle valve assembly on said support frame in axially aligned position with said discharge opening;

positioning the upper extending end of a receiver connected to a rotary valve on the trailer at a predetermined location with respect to an extending end of the throttle valve assembly; and connecting a flexible conduit between the extending end of the receiver and the extending end of the throttle valve assembly for the gravity flow of lading from the discharge opening in the container to the rotary valve.

35. An improved method of gravity unloading of particulate lading from a rear discharge opening in a removable intermodal container mounted on a pivoted container support frame of a trailer upon tilting of the container and support frame beyond the angle o repose of the lading within the container comprising the steps of:

placing a vertically extending lading conduit support frame on the container support frame adjacent the rear end of the container;

positioning a throttle valve assembly carried by said support frame adjacent the rear discharge opening of said container and securing the throttle valve assembly on said conduit support frame in axially aligned position with said discharge opening;

rotating the upper extending end of a receiver swivelly connected to a subjacent rotary valve on the trailer to a predetermined location with respect to an extending end of the throttle valve assembly;

rotating the rotary valve and receiver connected thereto about a generally horizontal axis relative to the trailer for movement of the upper end of the rotary valve to a predetermined location in a generally vertical plane toward and away from the rear end of the container;

connecting a flexible conduit between the extending end of the receiver and the extending end of the throttle valve assembly for the gravity flow of lading from the discharge opening in the container to the rotary valve;

tilting the container support frame and container to a predetermined angle beyond the angle of repose of the lading within the container; and rotating the rotary valve and receiver upon such tilting of the container for the proper positioning of the flexible conduit between the throttle valve assembly and the receiver.

36. A highway trailer for the gravity unloading of particulate lading from a detachable container removably supported on the highway trailer, the lading being adapted for gravity discharge through a bottom discharge opening adjacent a rear end door of the container, said highway trailer having a body having rear wheels and longitudinally extending support members supported on said rear wheels;

a container support frame mounted on said support members and adapted to releasably support a container;

means mounting the container support frame for pivotal movement relative to the body about an axis spaced horizontally and rearwardly of the rear end of the container;

power means mounted on the body for tilting the container and container support frame relative to the body;

a valve mounted on the body at a position rearward the rear end of container for receiving lading from the container;

a conduit with two ends connected between the valve and the bottom discharge opening of the container; and support means on the container support frame for supporting one end of the conduit adjacent the bottom discharge opening of the container, said support means including means for accurately positioning the conduit relative to the discharge opening of the container.

37. The apparatus of claim 36 including means mounting the valve on the body for pivotal movement of the valve about a horizontal axis in a generally vertical plane parallel to the axis of the body.

38. The apparatus of claim 37 wherein the means mounting said valve for pivotal movement at least around ten (10) degrees in opposite directions with respect to a dead center position of the valve for movement of the upper end of the valve toward and away from the rear end of the container.

39. The apparatus of claim 36 including a pneumatic hopper adjacent the valve to receive lading from the valve for pneumatic unloading.

40. The apparatus of claim 36 including
a pneumatic hopper adjacent the valve to receive lading from the valve for pneumatic unloading; and
means mounting said pneumatic hopper and valve on the body for pivotal movement about a horizontal axis in a generally vertical plane parallel to the longitudinal axis of the body, said means mounting said valve for pivotal movement at least around ten (10) degrees in opposite directions with respect to a dead center position of the valve for movement of the upper end o the valve toward and away from the rear end of the container.

41. A highway trailer for the gravity unloading of particulate lading from a detachable container removably supported on the highway trailer, the lading being adapted for gravity discharge from an opening at the rear of the container, the highway trailer having
a body with wheels with longitudinally extending support members on the wheels;
a frame adapted to removably support the container;
means mounting the rear end of the frame to the body for pivotal movement relative to the body about a generally horizontal axis spaced horizontally and rearwardly of the rear end of the container;
power means connected to the body and frame for raising the front end of the frame about the mounting means for tilting the frame and container relative to the body for gravity unloading;
a valve mounted on the body at a position rearward of the opening for receiving lading by gravity from the container;
means mounting the valve to the body for pivotal movement of the valve about a horizontal axis in a generally vertical plane parallel to the axis of the body; and
a flexible conduit having opposed ends detachably connected between the valve and the opening of the container.

42. The apparatus of claim 41 where the means mount for the valve for pivotal movement of at least around ten (10) degrees in opposite directions with respect to a dead center position of the valve for movement of the upper end of the valve toward and away from the rear end of the container.

43. The apparatus of claim 42 including a pneumatic hopper adjacent the valve to receive lading from the valve for pneumatic unloading.

44. Unloading apparatus on a highway trailer for unloading particulate lading from a discharge opening in a container supported on the highway trailer adjacent a rear end door of the container and discharging the lading into a high velocity air stream for movement of the lading to a storage facility, said unloading apparatus positioned horizontally between the rear wheels of the highway trailer and the rear end of the container and comprising:
a throttle valve assembly removably attached to the container inside said discharge opening upon opening of said rear end door and adapted to receive lading by gravity from said container through said discharge opening;
pneumatic conveying means mounted on said trailer horizontally between the rear wheels of the highway trailer and the rear end of the container and vertically below the container and adjacent the rear wheels of the highway trailer, said pneumatic conveying means having a high velocity air stream therewith for conveying the lading to a storage facility;
a detachable and flexible lading conduit extending between said throttle valve assembly and said pneumatic conveying means; and
a rotary valve adjacent said pneumatic conveying means to feed said lading from said lading conduit into said high velocity air stream.

45. Unloading apparatus as set forth in claim 44 wherein a transparent window is provided for said throttle valve assembly for a workman to observe the flow of lading from the container to the throttle valve assembly.

46. Unloading apparatus as set forth in claim 44 wherein a transparent window is provided adjacent said rotary valve for a workman to observe the flow of lading into the rotary valve from the throttle valve assembly.

47. Unloading apparatus as set forth in claim 44 wherein said throttle valve assembly includes a butterfly valve member and manually operated means for rotating said butterfly valve member to control the flow of lading from said container.

48. Unloading apparatus as set forth in claim 44 wherein said rotary valve comprises a rotary shaft and a plurality of vanes extending radially from said shaft to form pockets for the lading between adjacent vanes.

* * * * *